US012664291B2

(12) United States Patent
Grobelny et al.

(10) Patent No.: US 12,664,291 B2
(45) Date of Patent: Jun. 23, 2026

(54) SECURE COMMUNICATIONS BETWEEN SUBORDINATE WORKSPACES AND THIRD PARTIES

(71) Applicant: Dell Products L.P., Round Rock, TX (US)

(72) Inventors: Nicholas D. Grobelny, Evergreen, CO (US); Carlton A. Andrews, Spicewood, TX (US); Charles D. Robison, Buford, GA (US); Girish S. Dhoble, Toronto (CA)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 18/432,256

(22) Filed: Feb. 5, 2024

(65) Prior Publication Data
US 2025/0252194 A1 Aug. 7, 2025

(51) Int. Cl.
G06F 21/60 (2013.01)
G06F 21/62 (2013.01)

(52) U.S. Cl.
CPC .......... *G06F 21/602* (2013.01); *G06F 21/606* (2013.01); *G06F 21/6254* (2013.01)

(58) Field of Classification Search
CPC ... G06F 21/602; G06F 21/606; G06F 21/6254
See application file for complete search history.

(56) References Cited

U.S. PATENT DOCUMENTS

2022/0200796 A1* 6/2022 Robison .............. G06F 9/45558

* cited by examiner

*Primary Examiner* — Ayoub Alata
(74) *Attorney, Agent, or Firm* — Fogarty LLP

(57) ABSTRACT

Systems and methods for secure communications between subordinate workspaces and third parties are described. In an illustrative, non-limiting embodiment, an Information Handling System (IHS) may include a processor and a memory coupled to the processor, the memory having program instructions stored thereon that, upon execution by the processor, cause the IHS to: transmit one or more files received from a workspace orchestration service to a peripheral device, where the one or more files enable the peripheral device to instantiate a subordinate workspace; and facilitate secure communications between the subordinate workspace and a third-party.

17 Claims, 9 Drawing Sheets

800

200

300A

300B

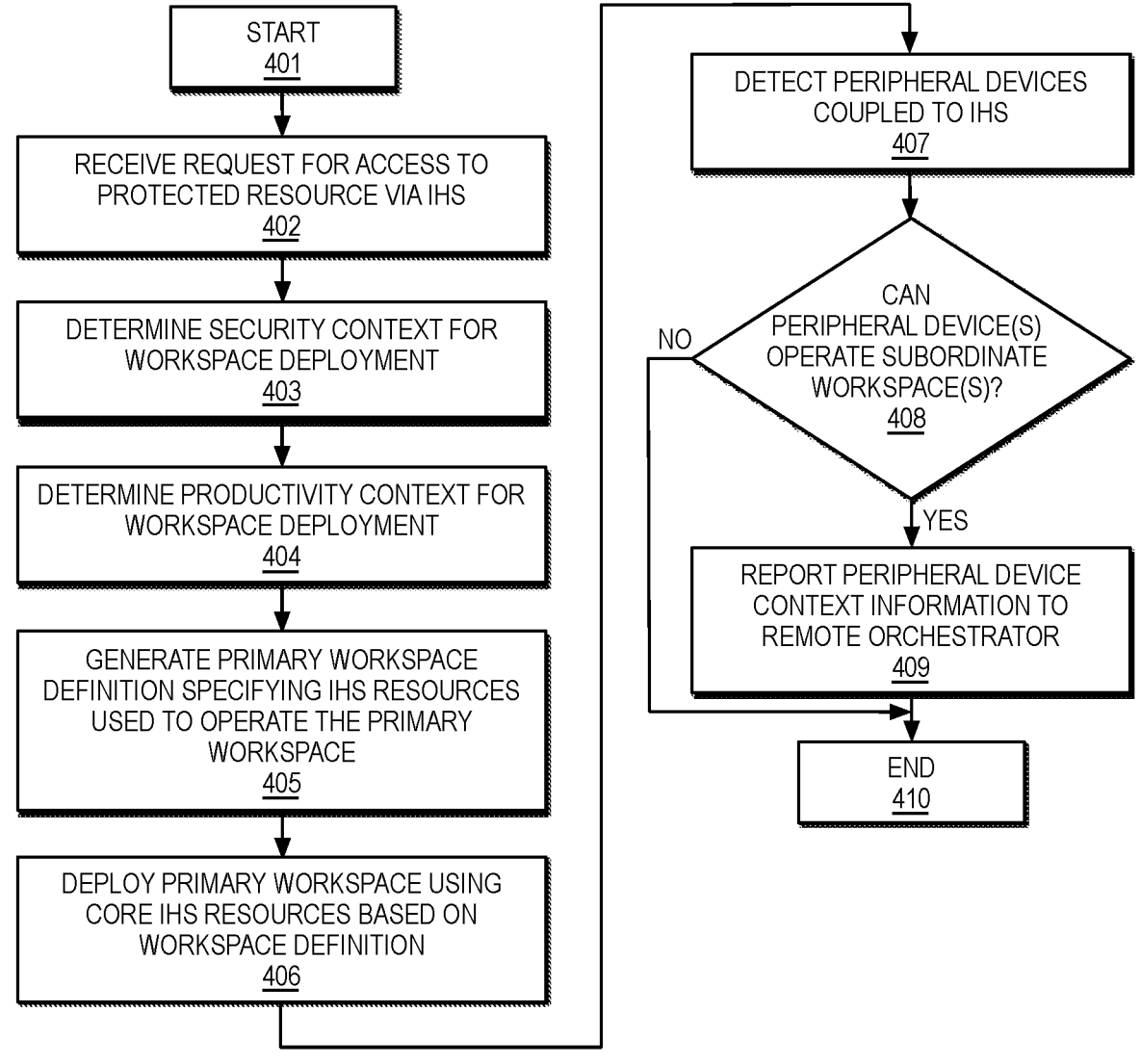

START
401

RECEIVE REQUEST FOR ACCESS TO PROTECTED RESOURCE VIA IHS
402

DETERMINE SECURITY CONTEXT FOR WORKSPACE DEPLOYMENT
403

DETERMINE PRODUCTIVITY CONTEXT FOR WORKSPACE DEPLOYMENT
404

GENERATE PRIMARY WORKSPACE DEFINITION SPECIFYING IHS RESOURCES USED TO OPERATE THE PRIMARY WORKSPACE
405

DEPLOY PRIMARY WORKSPACE USING CORE IHS RESOURCES BASED ON WORKSPACE DEFINITION
406

DETECT PERIPHERAL DEVICES COUPLED TO IHS
407

CAN PERIPHERAL DEVICE(S) OPERATE SUBORDINATE WORKSPACE(S)?
408

NO

YES

REPORT PERIPHERAL DEVICE CONTEXT INFORMATION TO REMOTE ORCHESTRATOR
409

END
410

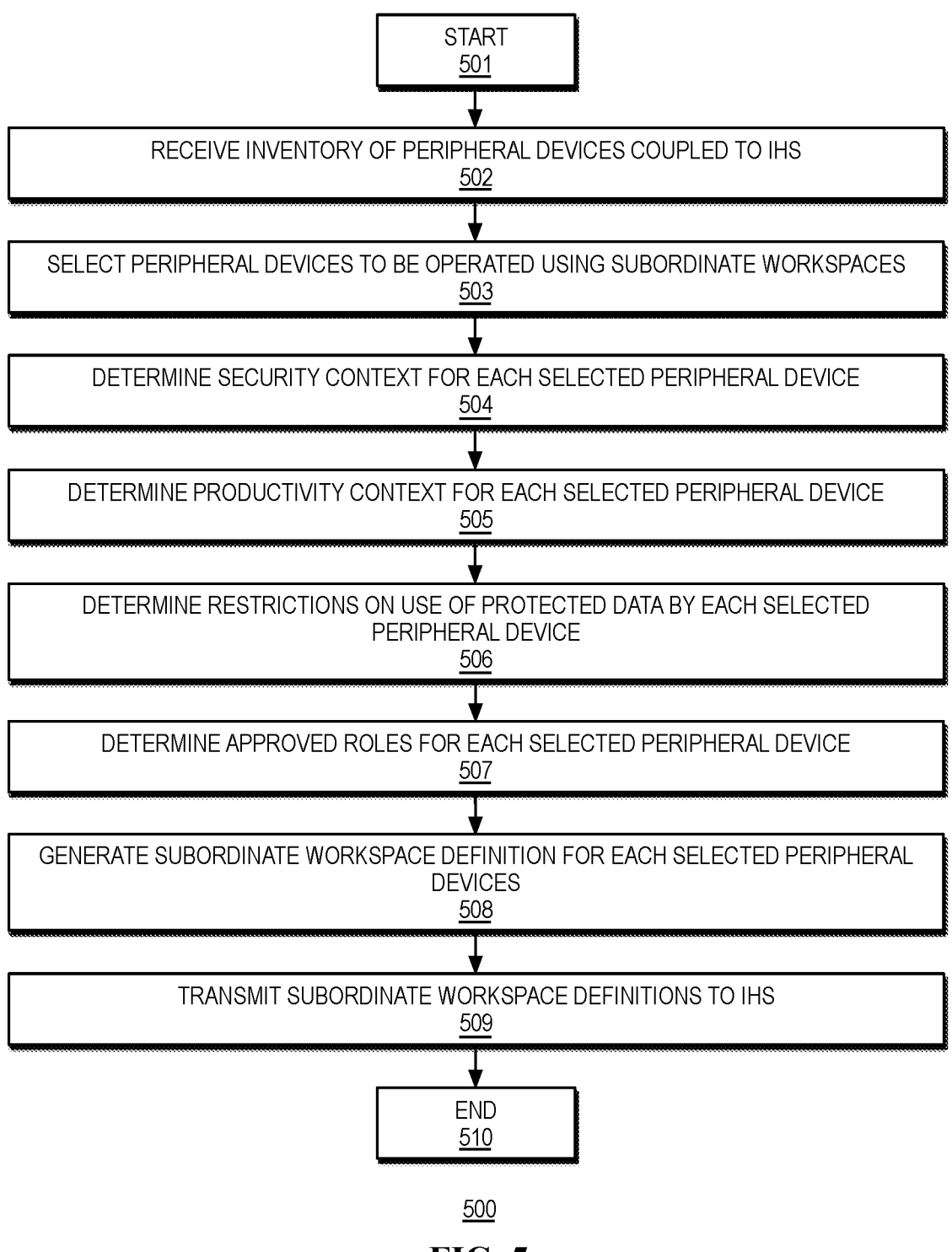

START
501

RECEIVE INVENTORY OF PERIPHERAL DEVICES COUPLED TO IHS
502

SELECT PERIPHERAL DEVICES TO BE OPERATED USING SUBORDINATE WORKSPACES
503

DETERMINE SECURITY CONTEXT FOR EACH SELECTED PERIPHERAL DEVICE
504

DETERMINE PRODUCTIVITY CONTEXT FOR EACH SELECTED PERIPHERAL DEVICE
505

DETERMINE RESTRICTIONS ON USE OF PROTECTED DATA BY EACH SELECTED
PERIPHERAL DEVICE
506

DETERMINE APPROVED ROLES FOR EACH SELECTED PERIPHERAL DEVICE
507

GENERATE SUBORDINATE WORKSPACE DEFINITION FOR EACH SELECTED PERIPHERAL
DEVICES
508

TRANSMIT SUBORDINATE WORKSPACE DEFINITIONS TO IHS
509

END
510

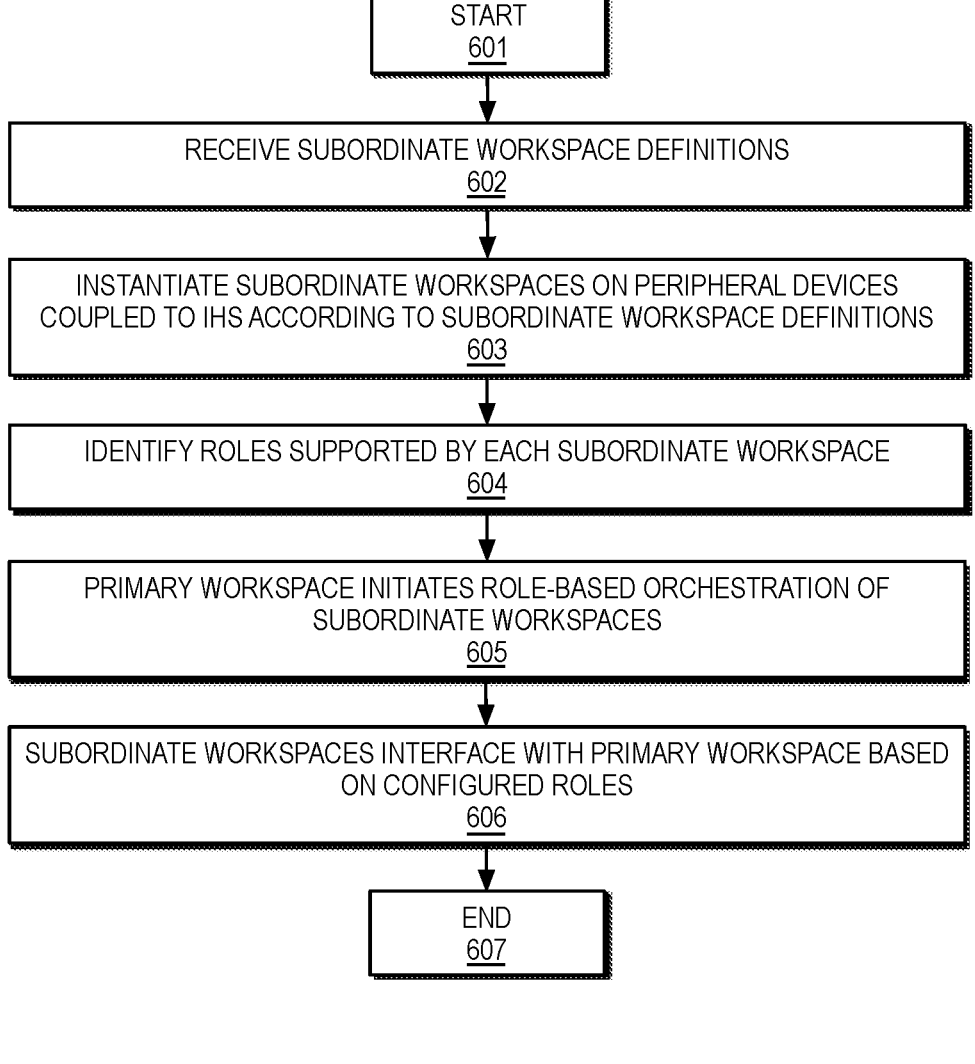

START
601

RECEIVE SUBORDINATE WORKSPACE DEFINITIONS
602

INSTANTIATE SUBORDINATE WORKSPACES ON PERIPHERAL DEVICES
COUPLED TO IHS ACCORDING TO SUBORDINATE WORKSPACE DEFINITIONS
603

IDENTIFY ROLES SUPPORTED BY EACH SUBORDINATE WORKSPACE
604

PRIMARY WORKSPACE INITIATES ROLE-BASED ORCHESTRATION OF
SUBORDINATE WORKSPACES
605

SUBORDINATE WORKSPACES INTERFACE WITH PRIMARY WORKSPACE BASED
ON CONFIGURED ROLES
606

END
607

SECURE COMMUNICATIONS BETWEEN SUBORDINATE WORKSPACES AND THIRD PARTIES

FIELD

This disclosure relates generally to Information Handling Systems (IHSs), and, more specifically, to systems and methods for secure communications between subordinate workspaces and third parties.

BACKGROUND

As the value and use of information continue to increase, individuals and businesses seek additional ways to process and store it. One option is an Information Handling System (IHS).

An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or for a specific use, such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs provide users with capabilities for accessing, creating, and manipulating data, and often implement a variety of security protocols to protect it. Historically, IHSs have been designed to implement security paradigms that isolate them from possible security threats, much like a castle is designed and constructed to safeguard persons within its walls.

In the case of a network of IHSs, for example, security systems implement strategies that isolate the entire network from threats. In effect, "castle walls" are constructed around the entire network. While working from within those walls, users may be provided with secure and productive use of data.

However, security paradigms that isolate protected data within the walls of a castle are increasingly frustrated by the realities of modern computing. Nowadays, users expect to access protected data using a plethora of different IHSs while located at a variety of physical locations. To leverage the security of the system providing access to the data, current protocols for supporting remote access have sought to extend the defenses of the system to remote IHSs, essentially extending the castle walls to temporarily include all or part of the remote IHSs.

Another complication of modern computing is the user's expectation that they will be able utilize their own personal IHSs to access some or all their protected data, even if those users are provided with enterprise issued IHSs for accessing it. For administrators of such systems, this increases the difficulty in securing all manners in which protected data may be accessed. This difficulty is greatly expanded by the need to support access to protected data using an ever-growing list of software applications, whether on a personal IHS or an enterprise issued IHS.

Moreover, the administration of such systems is further complicated by the need to support access to protected data from a variety of physical locations and via a variety of networks, including untrusted networks. Faced with such problems, systems for providing access to protected data are often burdensome to administer and ultimately the data is insufficiently protected to facilitate its productive use.

A technique for securing access to protected data accessed via an IHS is to isolate the data within a segregated or virtualization environment that runs on the IHS using a virtual machine or container. Conventional types of virtualization environments provide varying degrees of isolation from the hardware and operating system of the IHS.

However, similarly to the castle wall defenses of security paradigms that seek to isolate protected data within a secure perimeter, conventional virtualization environments are also ill-suited to modern computing. Particularly, these virtualization techniques establish an isolated computing environment on an IHS that allows a user to access only data and applications approved for that user.

In some instances, conventional virtualization techniques may determine the data, applications, and protections to be provided by on an IHS based solely on the identity of the user, and therefore tend to implement all security protocols that would be necessary to secure access to all approved data and applications. The inventors hereof have determined, however, that not only does conventional virtualization result in complex efforts that consume large portions of the memory and processing capabilities of the IHS, but it also does not account for what the user intends to do while operating the IHS.

As the inventors hereof have recognized, modern computing ought to provide users with access to protected data via a variety of IHSs and at practically any location. Yet conventional virtualization fails to account for the context in which an IHS is being used during a particular session, much less to account for changes to the context in which an IHS is used during a session. Furthermore, conventional virtualization techniques tend to provide support for many capabilities that are not used. The overhead required to provide such unnecessary capabilities unduly burdens the operation of an IHS and degrades productivity and user experience.

SUMMARY

Systems and methods for secure communications between subordinate workspaces and third parties are described. In an illustrative, non-limiting embodiment, an Information Handling System (IHS) may include a processor and a memory coupled to the processor, the memory having program instructions stored thereon that, upon execution by the processor, cause the IHS to: transmit one or more files received from a workspace orchestration service to a peripheral device, where the one or more files enable the peripheral device to instantiate a subordinate workspace; and facilitate secure communications between the subordinate workspace and a third-party.

The secure communications may utilize cryptographic material provisioned by the third-party prior to deployment of the peripheral device. For example, the cryptographic material may include at least one of: an encryption key pair, or a digital certificate. The peripheral device may be selected from the group consisting of: a docking station, a display, a projector, a tablet, a hard drive, a flash drive, a keyboard, a mouse, a trackpad, a joystick, a camera, a microphone, a speaker, a printer, a scanner, a sound card, or a video card.

The third party may include a manufacturer of the peripheral device. The secure communications may include telemetry data collected by the peripheral device. The telemetry data may include data indicative of use or health of the peripheral device.

The program instructions, upon execution, may cause the IHS to transmit at least a modified portion of the telemetry data to the workspace orchestration service. The modified portion may be anonymized or scrubbed of confidential data.

In another illustrative, non-limiting embodiment, a memory storage device may have program instructions stored thereon that, upon execution by one or more processors of an IHS, cause the IHS to: provision cryptographic material to a peripheral device prior to orchestration by a workspace orchestration service, where the peripheral device is configured to execute a subordinate workspace relative to a primary workspace; and receive data from the subordinate workspace, wherein the data is encrypted, at least in part, using the cryptographic material.

The cryptographic material may include at least one of: an encryption key pair, or a digital certificate. The peripheral device may be selected from the group consisting of: a docking station, a display, a projector, a tablet, a hard drive, a flash drive, a keyboard, a mouse, a trackpad, a joystick, a camera, a microphone, a speaker, a printer, a scanner, a sound card, or a video card. The IHS may be operated by a manufacturer of the peripheral device. The data may be indicative of use or health of the peripheral device.

In yet another illustrative, non-limiting embodiment, a method may include receiving one or more files from a primary workspace at a peripheral device, where the one or more files enable the peripheral device to instantiate a subordinate workspace; and establishing secure communications between the subordinate workspace and a third-party. The cryptographic material may include at least one of: an encryption key pair, or a digital certificate.

The peripheral device may be selected from the group consisting of: a docking station, a display, a projector, a tablet, a hard drive, a flash drive, a keyboard, a mouse, a trackpad, a joystick, a camera, a microphone, a speaker, a printer, a scanner, a sound card, or a video card. The third party may include a manufacturer of the peripheral device or a contributor of the subordinate workspace. The data may be indicative of use or health of the peripheral device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 4 is a diagram illustrating an example of a method for deploying a primary workspace and detecting/reporting peripheral devices, according to various embodiments.

FIG. 5 is a diagram illustrating an example of a method for generating subordinate workspaces, according to various embodiments.

FIG. 6 is a diagram illustrating an example of a method for operating subordinate workspaces, according to various embodiments.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

Figure 1:
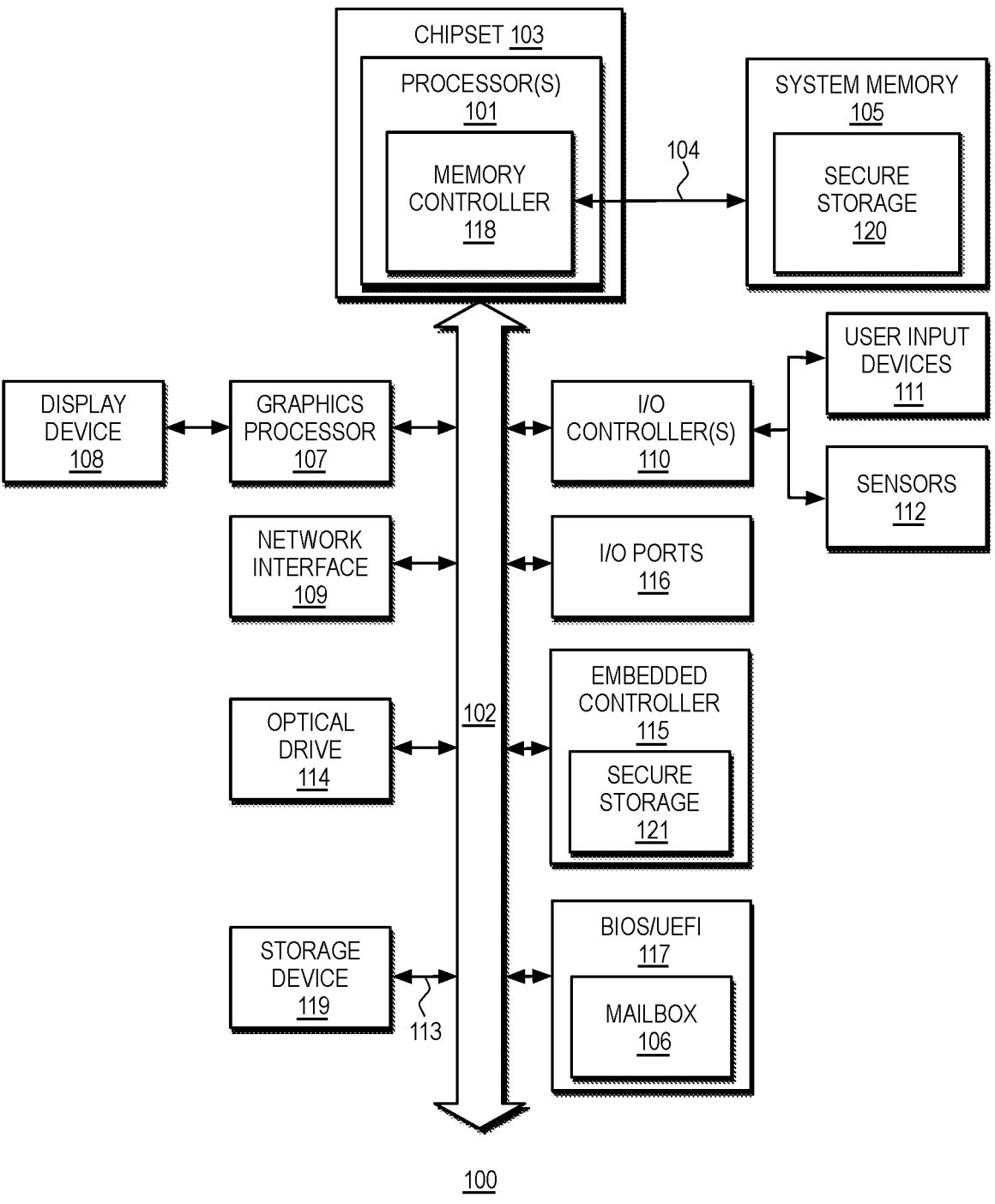
FIG. 1 is a diagram depicting illustrative components of an Information Handling System (IHS), according to various embodiments.

FIG. 1 is a diagram depicting internal components of IHS 100. In various embodiments, IHS 100 may be configured to implement systems and methods described herein. It should be appreciated that although certain implementations may be discussed in the context of a personal computing device, other implementations may utilize other types of IHSs.

As shown, IHS 100 may be employed to instantiate, manage, and/or terminate a workspace, such as a secure environment that may provide the user of IHS 100 with access to enterprise data (such as through a secure environment that may provide the user of IHS 100 with access to the enterprise data) while isolating the enterprise data from the Operating System (OS) and/or other applications executed by IHS 100. The construction of workspaces for a particular purpose and for use in a particular context may be orchestrated remotely from IHS 100 by workspace orchestration services 206. In some embodiments, however, certain workspace orchestration operations may be performed locally on IHS 100.

A workspace may operate using a variety of different configurations of the hardware and software resources of IHS 100, where the resources used may be selected based on the security and risk context of a request to access protected data. As described in additional detail below, a primary workspace and one or more subordinate workspaces may operate on an IHS 100, such that several workspace topologies may be supported using the available computing resources of IHS 100, including computing resources of external devices coupled to IHS 100. Based on the current risk and security context in which IHS 100 is operating, embodiments may switch between use of different workspace topologies.

IHS 100 may be configured with program instructions that, upon execution, cause IHS 100 to perform one or more of the various operations disclosed herein. In some embodiments, IHS 100 may be an element of a larger enterprise system that may include any number of similarly configured IHSs in network communications with each other.

In this example, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions.

Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes an integrated memory controller 118 that may be implemented directly within the circuitry of the processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 coupled to processor(s) 101 via memory bus 104 provides processor(s) 101 with a high-speed memory that may be used in the execution of computer program instructions by processor(s) 101. Accordingly, system memory 105 may include memory components, such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In some embodiments, system memory 105 includes secure storage 120 that may be a portion of the system memory designated for storage of information, such as access policies, component signatures, encryption keys, and other cryptographic information, for use in hosting a secure workspace on IHS 100. In such embodiments, a signature or hash may be calculated based on contents of secure storage 120 and stored as a reference signature or hash. The integrity of the data stored in secure storage 120 may then be validated later by recalculating this signature of the contents of the secure storage and comparing the recalculated signature against the reference signature.

IHS 100 utilizes chipset 103 including one or more integrated circuits coupled to processor(s) 101. In this embodiment, processor(s) 101 is depicted as a component of chipset 103. In other embodiments, however, all of chipset 103, or portions of chipset 108 may be implemented directly within the integrated circuitry of processor(s) 101.

Chipset 103 provides processor(s) 101 with access to a variety of resources accessible via bus 102. In IHS 100, communication bus 102 is illustrated as a single element. However, other implementations may utilize any number of buses to provide the communication pathways served by bus 102.

A variety of resources may be coupled to processor(s) 101 of IHS 100 through chipset 103. For instance, chipset 103 may be coupled to network interface 109, such as provided by a Network Interface Controller (NIC) that is coupled to the IHS 100 and allows the IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH.

In certain embodiments, network interface 109 may support connections between a trusted IHS component, such as trusted controller 115, and a remote orchestration service. In such embodiments, a connection supported by network interface 109 between the remote orchestration service and the trusted component may be considered an out-of-band (OOB) connection that is isolated from the OS of the IHS.

Chipset 102 may also provide access to one or more display device(s) 108 via graphics processor 107. In some embodiments, graphics processor 107 may be comprised within one or more video or graphics cards or an embedded controller installed as components of the IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS.

In some implementations, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

Chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.).

Chipset 103 may also include (or be coupled to) a sensor hub capable of utilizing information collected by sensors 112 in determining the relative orientation and movement of IHS 100. For instance, chipset 103 may employ the sensor hub to monitor inertial movement sensors, that may include accelerometer, gyroscope, and magnetometer sensors, and it may determine the current orientation and movement of IHS 100 (e.g., IHS 100 is motionless on a relatively flat surface, IHS 100 is being moved irregularly and is likely in transport, the hinge of IHS 100 is oriented in a vertical direction).

In certain embodiments, chipset/sensor hub 103 may also be configured to determine a location and movement of IHS 100 based on triangulation of network signal and based on network information provided by the OS or network interface 109. Chipset/sensor hub 103 may support additional sensors, such as optical, infrared and sonar sensors, which may provide support for Virtual, Augmented, and/or Mixed Reality (xR) sessions hosted by IHS 100, and/or may be used to obtain an indication of a user's presence near IHS 100, such as whether a user is present, absent, and/or facing the integrated display 108.

In cases where the end-user is present before IHS 100, chipset/sensor hub 103 may further determine a distance between the end-user and the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B). As described in additional detail below, the failure to detect an authenticated user of the IHS 100 within a proximity of the IHS 100 may result in a change in the security profile of IHS 100, thus triggering a re-evaluation of the security risk of workspaces operating on IHS 100. Similar re-evaluation may be triggered based on the detection of additional individuals in proximity to IHS 100.

When IHS 100 supports multiple physical configurations or form factors, such as a convertible laptop, N-in-1 device, or the like, chipset/sensor hub 103 may collect readings from one or more sensors usable to determine the current posture in which the IHS 100 is physically configured.

Other components of IHS 100 may include one or more I/O ports 116 for communicating with peripheral external devices as well as various input and output devices. For instance, I/O 116 ports may include High-Definition Multimedia Interface (HDMI) ports for use in connecting external display devices to IHS 100 and Universal Serial Bus (USB) ports, by which a variety of external devices may be coupled to IHS 100.

In some embodiments, external devices coupled to IHS 100 via an I/O port 116 may include storage devices that support transfer of data to and from system memory 105 and/or storage devices 119 of IHS 100. As described in additional detail below, the coupling of storage devices via I/O port 116 may result in a change in the security profile of IHS 100, thus triggering a re-evaluation of the security risk of workspaces operating on IHS 100.

Chipset 103 also provides processor(s) 101 with access to one or more storage devices 119. In various embodiments, storage device 119 may be integral to the IHS 100 or may be external to the IHS 100. In certain implementations, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some cases, storage device 119 may be a system of storage devices, such as a cloud drive accessible via network interface 109.

As illustrated, IHS 100 also includes BIOS (Basic Input/Output System)/Unified Extensible Firmware Interface (UEFI) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. BIOS/UEFI 117 instructions may also load an operating system for use by IHS 100. BIOS/UEFI 117 provides an abstraction layer that allows the OS to interface with the hardware components of IHS 100.

In the illustrated embodiment, BIOS/UEFI 117 includes a predefined memory or memory region that may be referred to as NVM (Non-Volatile Memory) mailbox 106. In such an implementation, mailbox 106 may provide a secured storage location for use in storing workspace access policies, signatures, cryptographic keys or other data utilized to host and validate a workspace on IHS 100. In certain embodiments, the BIOS mailbox 106 may be utilized as a secure storage utilized by a remote orchestration service to store access policies and cryptographic keys for use in delivering and deploying a secured container on IHS 100. BIOS mailbox 106 and secured storage 120 in system memory 105 may be utilized in this manner instead of, or in conjunction with, out-of-band functions implemented by trusted controller 115.

In certain embodiments, Embedded Controller (EC) 115 may be installed as a component of IHS 100. EC 115 may perform various operations in support of the delivery and deployment of a workspace to IHS 100. In certain embodiments, EC 115 may interoperate with a remote orchestration service via an out-of-band communications pathway that is isolated from the OS that runs on IHS 100. Network interface 109 may support such out-of-band communications between trusted controller 115 and a remote orchestration service.

EC 115 may receive cryptographic information required for secure delivery and deployment of a workspace to IHS 100. In such embodiments, the cryptographic information may be stored to secured storage 121 maintained by EC 115. Additionally, or alternatively, EC 115 may support execution of a trusted operating environment that may support cryptographic operations used to deploy a workspace on IHS 100. Additionally, or alternatively, EC 115 may support deployment of a workspace within the OS of IHS 100 via an out-of-band communications channel that is isolated from the OS and allows the workspace to communicate with a trusted agent process of the OS.

EC 115 may also provide support for certain cryptographic processing used to support secure deployment and operation of workspaces in IHS 100. In some embodiments, such cryptographic processing may be provided via operations of a secure operating environment hosted by EC 115 in isolation from the software and other hardware components of IHS 100. In some embodiments, EC 115 may rely on cryptographic processing provided by dedicated cryptographic hardware supported by the IHS, such as a Trusted Platform Module (TPM) microcontroller. In some embodiments, secure may be utilized to store cryptographic information for use in authorization of workspaces.

In certain embodiments, EC 115 may be additionally configured to calculate signatures that uniquely identify individual components of IHS 100. In such scenarios, EC 115 may calculate a hash value based on the configuration of a hardware and/or software component coupled to IHS 100. For instance, trusted controller 115 may calculate a hash value based on all firmware and other code or settings stored in an onboard memory of a hardware component, such as a network interface 109. Such hash values may be calculated as part of a trusted process of manufacturing IHS 100 and may be maintained in secure storage 121 as a reference signature.

EC 115 may be further configured to recalculate a hash value later for such a component. The hash value recalculated for the component may then be compared against the reference hash value signature to determine if any modifications have been made to a component, thus indicating the component has been compromised. In this manner, EC 115 may be used to validate the integrity of hardware and software components installed on IHS 100.

In certain embodiments, remote orchestration service 206 may verify the integrity of the EC 115 in the same manner, by calculating a signature of EC 115 and comparing it to a reference signature calculated during a trusted process for manufacture of IHS 100. In various embodiments, one or more of these operations supported by EC 115 may be implemented using BIOS/UEFI 117.

EC 115 may also implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 115 may be used to operate a secure execution environment that may include operations for providing various core functions of IHS 100, such as power management and management of certain operating modes of IHS 100 (e.g., turbo modes, maximum operating clock frequencies of certain components, etc.).

IHS 100 may support the use of various power modes. In some embodiments, the power modes of IHS 100 may be implemented through operations of EC 115 and/or the OS of IHS 100. In various embodiments, IHS 100 may support various reduced power modes to reduce power consumption and/or conserve battery power when IHS 100 is not actively in use, and/or to control a level of performance available to the user by increasing or decreasing a maximum operating clock frequency of a component of IHS 100 (e.g., processor (s) 101).

In managing operating modes of IHS 100, EC 115 may implement operations for detecting certain changes to the physical configuration of IHS 100 and managing the modes corresponding to different physical configurations of IHS 100. For instance, where IHS 100 is a laptop computer or a convertible laptop computer, EC 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

In various embodiments, IHS posture determinations may be made using trusted controller or EC 115. For example, in laptop and convertible laptop embodiments, EC 115 may utilize a lid position sensor 112 to determine the relative angle between the two panels of the laptop to determine the mode in which IHS 100 is physically configured. In such embodiments, the lid position sensor may measure the angle of rotation of the hinge that connects the base panel and lid panel of IHS 100. In some embodiments, processor 101 or EC 115 may provide collected lid position information, such as the hinge angle, to chipset/sensor hub 103 for use in determining the posture in which IHS 100 is configured. In some embodiments, chipset/sensor hub 103 may interface directly with the lid position sensor in determining hinge angle information.

EC 115 may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture.

EC 115 may additionally utilize orientation and movement information collected from inertial movement sensors 112 to further determine the posture in which the IHS 100 is physically configured. For instance, if EC 115 determines that IHS 100 is configured with a hinge angle of a laptop configuration, but IHS 100 is oriented on its side, HIS 100 may be determined to be in a book mode. If IHS 100 is determined to be tilted such that the hinge is oriented between horizontal and vertical, the user's face is detected to be facing the integrated display, and IHS 100 is experiencing slight movement, EC 115 may determine that the IHS 100 is being used in a book posture. If EC 115 determines that IHS 100 is opened to a 180-degree hinge angle and lies on a flat surface, it may detect that IHS 100 is being used in a landscape posture. Similarly, EC 115 may determine that IHS 100 is in a tent configuration in response to detecting a hinge angle within a defined range, such as between 300 and 345 degrees, where the hinge is aligned horizontally and is higher than both display panels of IHS 100.

In various embodiments, any of user input devices 111, sensors 112, display device 108, graphics processor or card 107, optical drive 114, and/or storage device 119 may constitute a peripheral device coupled to IHS 100. In some cases, one or more of these peripheral devices may include processing and memory power to enable it to instantiate subordinate workspaces.

As described in additional detail below, a subordinate workspace may operate using the resources of a peripheral device and based on a subordinate workspace definition through orchestration by a primary workspace operating on core resources of IHS 100, such as CPU 101 and system memory 105. In this manner, certain operations involved in workspace orchestration, including the creation and delegation of tasks to subordinate workspaces, may be performed locally on IHS 100.

In some scenarios, a peripheral device coupled to IHS 100 may be a public or shared-use display device, such as provided to the user of IHS 100 via a shared or public workstation. In some implementations, a primary workspace may interface with a peripheral device via a subordinate workspace operating on the peripheral device, where the capabilities of the peripheral device are provided according to a role that has been assigned to the peripheral device and that may be indicated in the subordinate workspace definition of the subordinate workspace.

Each of these exemplary computing architectures or topologies presents different attack surfaces that may potentially be exploited by malicious actors. As described in additional detail below, a computing architecture selected for use by a workspace may be selected based in part on a security context that may account for the security posture of IHS 100, the user 201, the use of subordinate workspaces, the roles supported by subordinate workspaces in operating peripheral devices 214 coupled to IHS 100, environment 202, and/or the information that is being accessed via the workspace. As such, the attack surface presented by the computing architecture of a workspace, and any subordinate workspaces, may be selected to be commensurate with the security context in which the workspace will operate.

In some embodiments, an IHS 100 may not include all the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
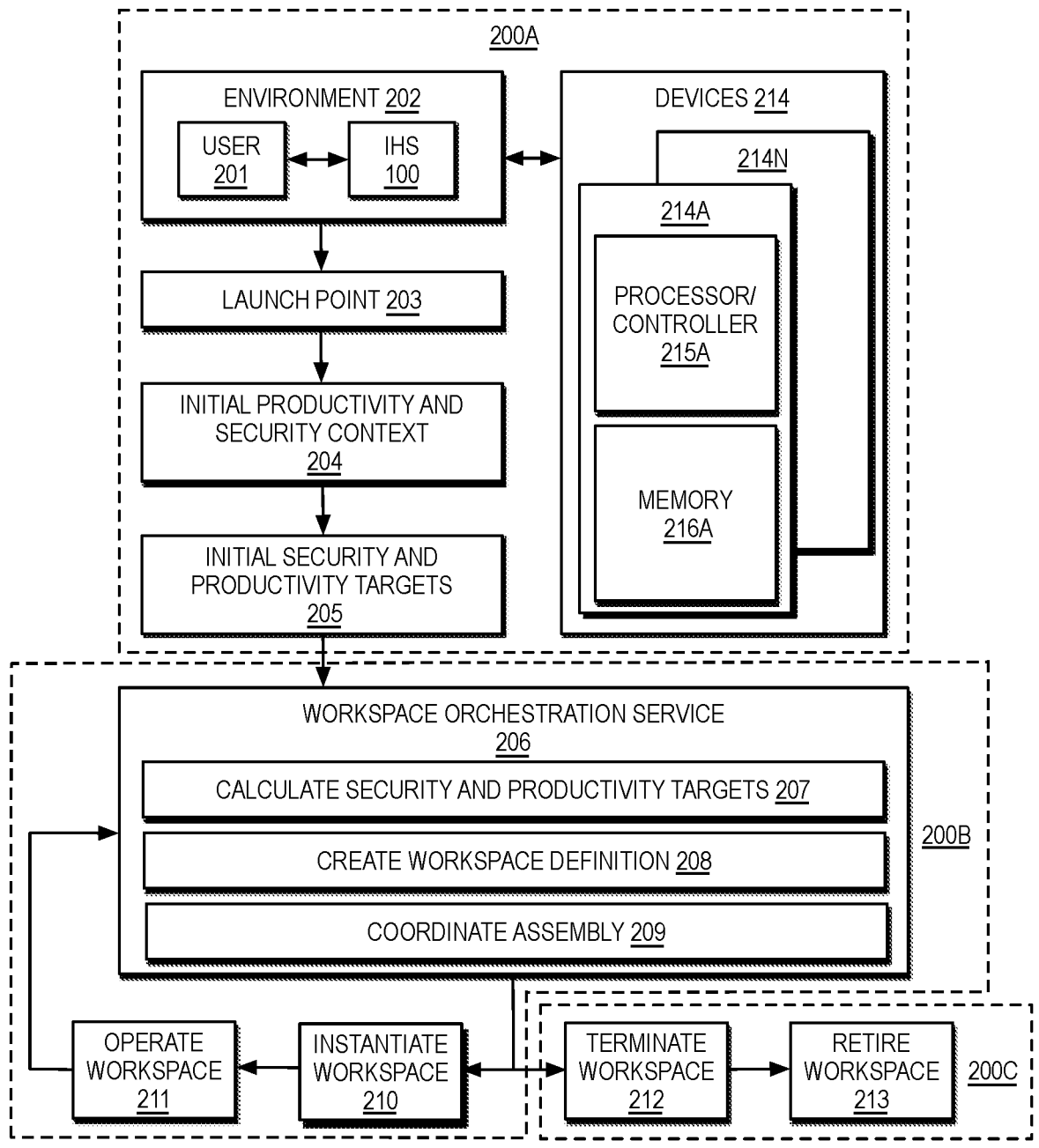
FIG. 2 is a diagram depicting a method for orchestrating the deployment and operation of workspaces, according to various embodiments.

FIG. 2 is a diagram depicting an example of method 200 for orchestrating the deployment and operation of workspaces. For ease of explanation, method 200 has been split into three phases: workspace initialization phase 200A, workspace orchestration phase 200B, and workspace termination phase 200C.

During initialization 200A, user 201 (e.g., an enterprise user) operates IHS 100 (e.g., a desktop, a laptop, a tablet, a smartphone, etc.) within physical environment 202 (e.g., any type of environment and its associated context, including physical location, geographic location, location within a particular facility, building, or office, detected networks, time of day, proximity of the user, individuals in the vicinity of IHS 100, etc.).

In some cases, IHS 100 may be coupled to (or user 201 may otherwise operate) any number of peripheral devices 214A-N. One or more peripheral devices 214A-N may include its own processor 215A-N and memory 216A-N, and it may be capable of instantiating or operating a subordinate workspace. Examples of peripheral devices 214A-N include, but are not limited to, a docking station, a display, a projector, a tablet, a hard drive, a flash drive, a keyboard, a mouse, a trackpad, a joystick, a camera, a microphone, a speaker, a printer, a scanner, a sound card, or a video card, etc. In some scenarios, one or more peripheral devices 214A-N may be a public or shared-use device, such as a projector in a conference room, and it may operate based on a subordinate workspace definition through role-based orchestration provided by a primary workspace that operates on core resources of IHS 100.

Method 200 starts with an action by user 201 at launch point 203 which may be, for example, a corporate launch point provided by an employer of user 201, by the manufacturer of IHS 100, or a third-party service. For example, launch point 203 may be implemented in the form of a web portal, a portal application running in the OS of IHS 100, a special-purpose portal workspace operating on IHS 100, or the like.

In various implementations, launch point 203 may include Graphical User Interface (GUI) elements representing different software applications, data sources and/or other resources that the user may desire to execute and/or manipulate. Launch point 203 may provide a graphical, textual and/or audio interface by which data or other resources may be requested by user 201. Once authenticated, launch point 203 provides user 201 with visibility as to one or more software applications and an aggregation of user's data sources available across multiple datastores (e.g., local storage, cloud storage, etc.).

In various embodiments, launch point 203 may be provided in the form of a portal (e.g., a webpage, OS application or special purpose workspace) that allows user 201 to request access to managed resources. In various embodiments, launch point 203 may be hosted by remote workspace orchestration service 206 and/or local management agent 332. Examples of launch point 203 technologies may include WORKSPACE ONE INTELLIGENT HUB from WMWARE, INC., and DELL HYBRID CLIENT from DELL TECHNOLOGIES INC., among others.

Initialization phase 200A begins when user 201 chooses to launch an application or access a data source managed by workspace orchestration service 206. In response to an access request issued by user 201 (e.g., the user "clicks" on an icon of launch point 203), local management agent 332 collects initial security and productivity context information at 204.

The term "security context," as used herein, generally refers to data or other information related to a security posture in which a workspace will be deployed and utilized, where the security posture may be based on user 201, IHS 100, data to be accessed via the workspace, and/or environment 202.

Security context information may include attributes indicating a security risk associated with: the data and/or application being requested, a level of risk presented by the user 201, the hardware utilized by the IHS 100, the logical environment of IHS 100 in which a workspace will be deployed to provide access to the requested data and/or application, and the physical environment 202 in which IHS 100 is currently located.

A security context may be quantified as a security risk score in support of evaluations of the level or risk associated with providing user 201 access to requested data and/or application while using IHS 100 in the particular context. A "security risk score" generally refers to a numerical value usable to score, quantify, or measure various security characteristics of the security context associated with a request. A risk score may be an aggregate score associated with the overall security risk context, whereas a "risk metric" may be a measurement of risk for a sub-category of some part of the security context.

Security metrics that may be used in the calculation of a security risk score for a particular security context may include, but are not limited to: a classification of the requested data source and/or application, authentication factors used to identify user 201, the location of IHS 100, a role or other group classifications associated with user 201, validation of networks in use by IHS 100, type of network in use by IHS 100, network firewall configurations in use by IHS 100, Indicators of Attack (IoA), Indicators of Compromise (IoC) regarding IHS 100 or a resource being requested by user 201, patch levels associated with the OS and other applications in use, availability of encryption, type of available encryption, access to secured storage, use of attestable hardware by IHS 100, supported degree of workspace isolation by IHS 100, external devices 214 that coupled to IHS 100, subordinate workspace roles being used in the operation of external devices 214, etc.

The term "productivity context" generally refers to user productivity associated with a workspace, user, IHS, or environment. A "productivity score" generally refers to an index usable to score, quantify, or measure various productivity characteristics of a productivity context. Examples of productivity context information include, but are not limited to: the hardware of the IHS, the software of the IHS, including the operating system, power states and maximum clock frequencies of selected components of the IHS, peripheral devices coupled to the IHS, either permanently or temporarily, networks available to the IHS and the performance characteristics of those networks, software installers available on the IHS, subordinate workspace roles being used in the operation of external devices 214, etc.

At 205, initial productivity and security targets for a workspace may be calculated based on the context of user's 201 actions combined with the productivity and security context in which the workspace will operate. The productivity and security targets may also be based on user's 201 behavioral analytics, IHS 100 telemetry and/or environmental information (e.g., collected via sensors 112). In some cases, at 205, a local management agent operating on IHS 100 may calculate initial security and productivity targets based upon the collected security and productivity context. In other cases, remote workspace orchestration service 206 may calculate security and productivity targets.

As used herein, the term "security target" generally refers to the attack surface presented by a workspace that is created and operated based on a workspace definition, while the term "productivity target" generally refers to the productivity characteristics of a particular workspace definition. Examples of a productivity target include, but are not limited to: type of data or data source available to user 201, minimum latency of a workspace, etc. Conversely, attributes that may be used to characterize a security target may include, but are not limited to: a minimum security score for a workspace, a minimum trust score of IHS 100, authentication requirements for user 201 (e.g., how many authentication factors are required, frequency of re-authentication), minimum level of trust in the network utilized by a workspace, required isolation of a workspace from IHS 100, the ability to access browser within a workspace, the ability to transfer data between workspaces, the ability to extend a primary workspace using one or more subordinate workspaces, the security context for any subordinate workspaces, APIs used to support roles by subordinate workspaces operating on external devices 214, etc.

Workspace orchestration phase 200B begins as workspace orchestration service 206 calculates security and/or performance/productivity targets 207, produces and/or modifies workspace definitions 208, and coordinates the assembly 209 and/or instantiation 210 of workspaces.

The term "workspace definition" generally refers to a collection of attributes that describe aspects a workspace that may be assembled, created, and deployed in a manner that satisfies a security target (i.e., the definition presents an attack surface that presents an acceptable level of risk) and a productivity target (e.g., data access, access requirements, upper limits on latency, etc.) in light of the security context (e.g., location, patch level, threat information, network connectivity, etc.) and the productivity context (e.g., available device type and performance, network speed, etc.) in which a workspace is to be deployed.

Workspace definition 208 may enable fluidity of migration of an instantiated workspace since the definition supports the ability for a workspace to be assembled on any target OS or IHS that is configured for operation with the workspace orchestration service 206.

In describing capabilities and constraints of a workspace, workspace definition 208 may prescribe one or more of: authentication requirements for user 201, containment and/or isolation of the workspace (e.g., local application, sandbox, docker container, progressive web application or "PWA," Virtual Desktop Infrastructure "VDI," etc.), primary applications that may be executed in the defined containment of the workspace to enable user 201 to be productive with one or more data sources, additional applications that enhance productivity, security components that reduce the scope of the security target presented by the productivity environment (DELL DATA GUARDIAN from DELL TECHNOLOGIES INC., an anti-virus, etc.), the data sources to be accessed and requirements for routing that data to and from the workspace containment (e.g., use of VPN, minimum encryption strength), workspace capabilities to independently attach other resources, constraints on the ability to generate subordinate workspaces, descriptions of any already operating subordinate workspaces, etc.

In some embodiments, workspace definition 208 selected for operation of a workspace may specify a computing architecture for use in the operation of the workspace. Such a computing architecture may be selected for use by a workspace based in part on a security context of IHS 100, where this security context may account for factors such as the security posture of IHS 100, user 201, environment 202, and/or the information that is being accessed via the workspace. In this manner, the attack surface presented by the computing architecture in use by a workspace may be selected to be commensurate with the security context in which the workspace will operate.

A computing architecture or topology in use by a workspace may include the use of one or more subordinate workspaces that may operate using the discrete logic and memory resource of devices 214 coupled to IHS 100, thus altering the attack surface of the workspace. The attack surface of a subordinate workspace may be further restricted to one or more APIs that correspond to roles that are supported by a peripheral device and that may be used in the orchestration of the subordinate workspace by the primary workspace.

In some implementations, workspace definition 208 may be created based at least in part on policies or rules defined, for example, by an enterprise's Information Technology (IT) personnel. In some implementations, rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration service 206 may autonomously add that application to the default workspace definition for that user.

During orchestration 200B, initial security and productivity targets 205 are processed and/or reconciled against resources, device capabilities, and cloud services available, etc., to create workspace definition at 208. Workspace definition 208 may specify capabilities and constraints of a workspace, such as: runtime security requirements of the workspace containment (e.g., such as isolation from the OS of IHS 100 or from certain hardware of IHS 100), the use of reference measurements to attest to the integrity of the workspace once running, applications to be provided for operation within the workspace, aggregation of resources available via the workspace, access configurations (e.g., virtual private network or "VPN"), any subordinate workspaces, roles supported by subordinate workspaces, one or more remote workspace orchestrators 206 authorized to modify a workspace definition or to otherwise interface with a workspace, etc.

The initial workspace definition may then be utilized by automation engine 302 of workspace orchestration service 206 to coordinate the assembly 209 and instantiation 210 of a workspace on an appropriate platform—e.g., on the cloud or on IHS 100—based on the security and productivity contexts in which the workspace or components thereof will operate. Workspaces configured to provide user 201 with access to requested data or other resources may be instantiated using local management agent 332.

In cases where a workspace or at least one of its components is cloud-hosted, automation engine 302 may assemble and instantiate a remote workspace that may be accessed via a secure connection established via a web browser or other web-based component operating on IHS 100. In some embodiments, automation engine 302 may resolve configuration conflicts between a workspace definition and the user's inputs in the operation of a workspace.

The instantiated workspace is operated by user 201 at 211, and new productivity and security context information related to the behavior or use of data is generated. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation of the security and performance targets at 207 by automation engine 302. Additionally, or alternatively, new workspace context, security target, and/or productivity target may be now measured against the initial targets, and the result may cause automation engine 302 to produce a new workspace definition at 208, if appropriate.

Particularly, if the instantiated workspace(s) have parameters that fall outside of the range of the target indexes such that a difference between additional or updated context information and the initial or previous context information is scored below a threshold value, automation engine 302 may process the assembly of modifications to an existing workspace definition at 208 and deploy such modifications at 209. Conversely, if the difference between the additional or updated context information and the initial or previous context information is scored above a threshold value, automation engine 302 may generate a new workspace definition at 208. Session data metadata and context may be preserved by data aggregation engine 336, and session data may be restored as applicable.

In termination phase 200C, method 200 may terminate the workspace at 212 and retire it at 213. In some cases, user action may initiate the termination process (e.g., user 201 closes application or browser accessing data) and/or termination may take place automatically as part of an adjustment in workspace definition (e.g., the isolated environment is instructed to terminate by automation engine 302). Still as part of termination phase 200C, workspace resources of IHS 100 and/or at workspace orchestration service 206 may be released.

As such, in various embodiments, method 200 enables secure user productivity even when a workspace operates on an IHS or cloud platform that is not under direct management. Method 200 also provides for dynamic or adaptive configurations and policies allowing for the best possible user experience while maintaining an appropriate level of security. In some cases, the definition of a productivity environment and access requirements may be selected based upon productivity and security dependencies and targets, and the definition of capabilities related to the workspace may be adaptive in nature. Particularly, workspace definition attributes may be dynamically selected based upon historical productivity and security information, based upon each individual user or group's behavior.

Figure 3A:
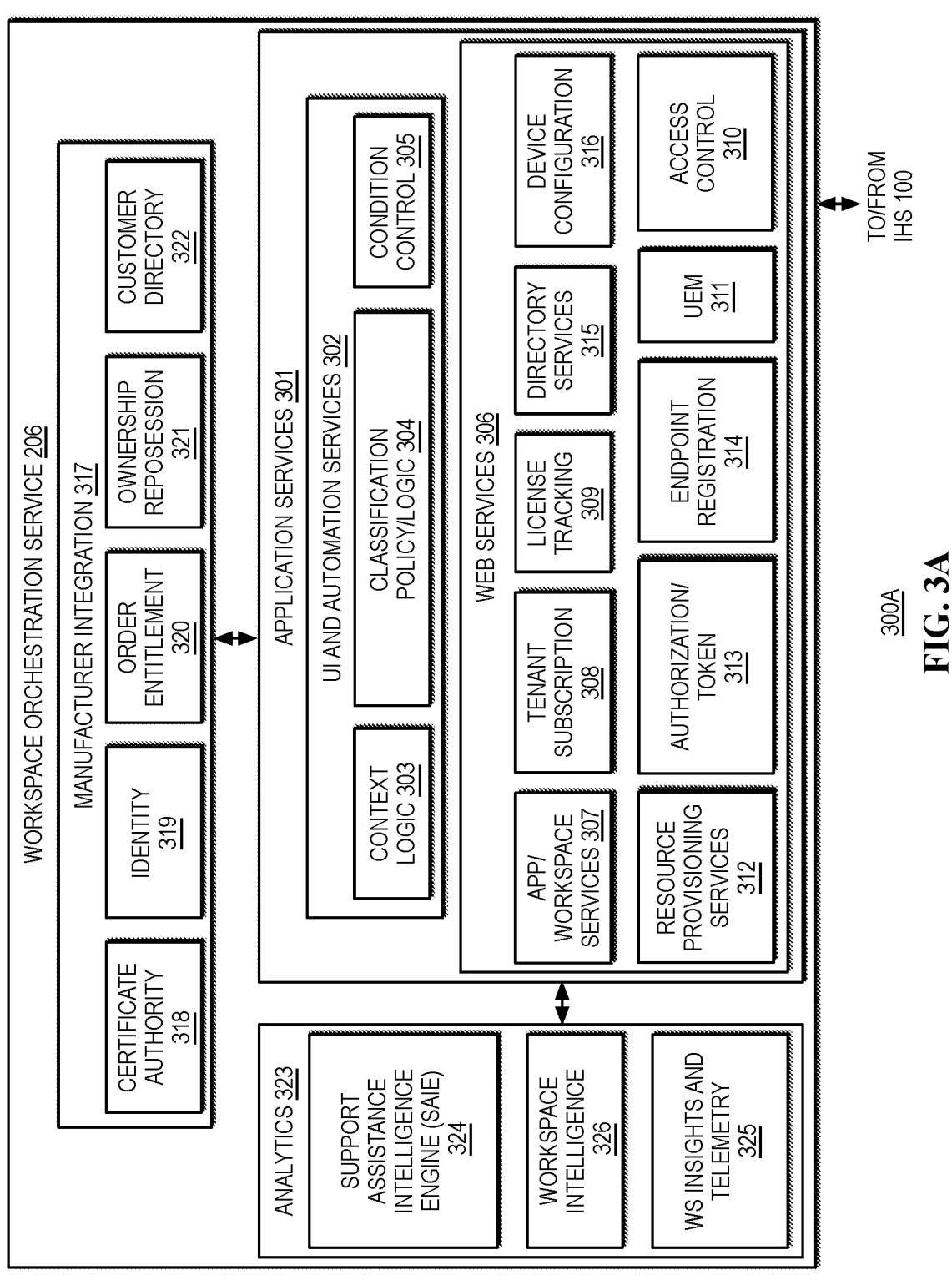
FIGS. 3A and 3B are diagrams depicting an example of a system configured for deploying and operating workspaces, according to various embodiments.
Figure 3B:
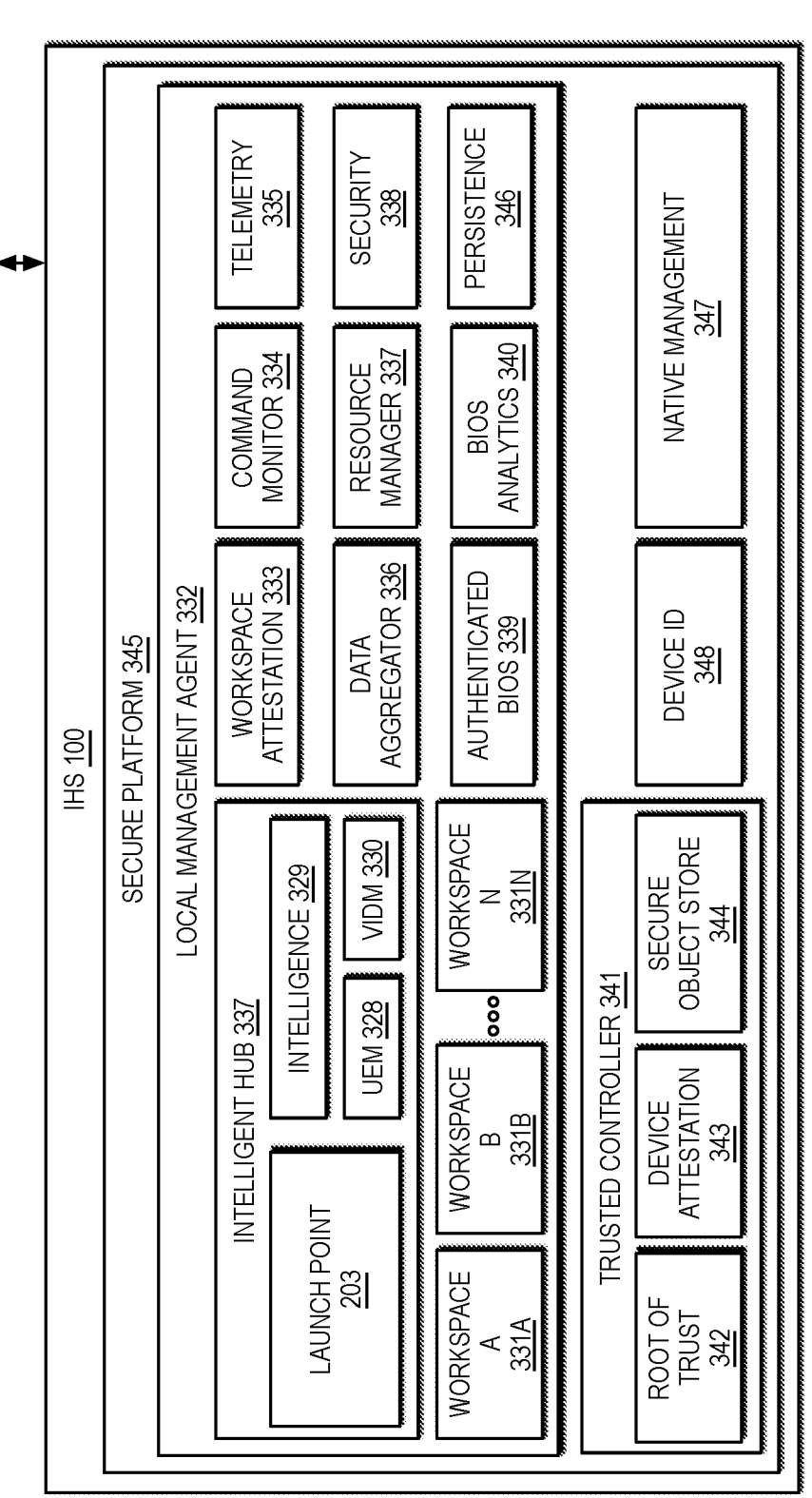

FIGS. 3A and 3B show diagrams of an example of components 300A and 300B (collectively referred to as "system 300") configured for deploying and operating primary and/or subordinate workspaces.

Although components 300A and 300B show a workspace orchestration service 206. In some embodiments, orchestration of an individual workspace operating on IHS 100 may be transferred between different workspace orchestration services throughout the lifecycle of the workspace. For instance, a workspace may be configured and initialized based on a workspace definition provided by a workspace orchestration service that is operated by the manufacturer of IHS 100. However, during ongoing operation of this particular workspace, orchestration of the workspace may be transferred to a workspace orchestration service operated by an entity that employs the user of IHS 100. Further operation of this workspace may then result in orchestration being transferred to a workspace orchestration service operated by a provider of software operating on IHS 100, such as by the provider of an operating system of IHS 100. In some embodiments, orchestration of a workspace may be transferred to a special-purpose orchestrator that supports IHS 100 in configuring subordinate workspaces, and in particular for operation of subordinate workspace by unknown or untrusted peripheral devices that are coupled to IHS 100, such as peripheral devices 214 provided by a public or shared workstation.

Particularly, component 300A comprises workspace orchestration service 206, and may include one or more IHSs remotely located and/or networked having program instructions stored thereon that, upon execution, cause the one or more IHSs to perform various workspace orchestration operations described herein, including, but not limited to: the dynamic evaluation of security and productivity targets based upon updated context information received from IHS 100, the calculation of risk scores and other productivity and security metrics based on ongoing collection of context information, the generation of workspace definitions, and the assembly of one or more files or policies that enable the instantiation of a workspace in accordance with a workspace definition at a cloud service and/or IHS 100.

Component 300B includes IHS 100 configured with program instructions stored thereon that, upon execution, cause IHS 100 to perform various local management operations described herein, including, but not limited to, the collection of productivity and security context information, the calculation of productivity scores and/or risk scores, the instantiation, execution, and modification of a workspace based upon files or policies, such as workspace definitions, received from workspace orchestration service 206, etc.

Components 300A and 300B may be coupled to each other via any suitable network technology and/or protocol, which allows workspace orchestration service 206 to be remotely provided with respect to component 300B. As described above, IHS 100 of component 300B may include EC 115, which may support certain secure out-of-band communications independent from the OS of IHS 100. In some embodiments, EC 115 may be configured to support deployment and operation of workspaces on IHS 100 and to report changes in context information to component 300A.

In component 300A, workspace orchestration service 206 may include several sub-components that support deployment and ongoing evaluation and adaptation of workspaces on component 300B. Particularly, workspace orchestration service 206 includes application services 301 having User Interface (UI) and automation services 302 and web services 306, as well as manufacturer integration services 317, and analytics services 323.

Analytics services 323 may be configured to receive and process context information from IHS 100, both during initial configuration of a workspace and in ongoing support of workspaces, and to provide that information, along with any analytics generated, to context logic 303. Based on information collected during the deployment and ongoing support of workspaces, support assistance intelligence engine (SAIE) 324 may be configured to generate and/or analyze technical support information (e.g., updates, errors, support logs, etc.) for use in diagnosing and repairing workspace issues. Workspace insights and telemetry engine 325 may be configured to analyze and/or produce device-centric, historical, and behavior-based data (e.g., hardware measurements, use of features, settings, etc.) resulting from the operation of workspaces. Workspace intelligence 326 may include any suitable intelligence engine for processing and evaluating context data to identify patterns and tendencies in the operation of workspaces and in the adaptation of workspaces based on context changes.

UI and automation services 302 may include context logic or engine 303, classification policy 304, and condition control module or engine 305. Context logic or engine 303 may support processing of context information in making risk assessments (e.g., evaluating the risk associated requests by the user against the context of the user's behavior, history of the user's IHS, capabilities of the user's IHS, and environmental conditions).

For instance, security context information collected by IHS 100 may be provided to workspace orchestration service 206 where it may be used, such as by context logic 303, to calculate a risk score associated with a request for use of a managed data source and/or application.

Classification policy 304 may include administrator and machine-learning defined policies describing risk classifications associated with different security contexts, such as risk classifications for specific data, locations, environments, IHSs, logical environments, risk classifications for subordinate workspace topologies, or user actions (e.g., use of high-risk data requires use of a workspace definition suitable for use with a risk score above a specific value).

Condition control module or engine 305 may include intelligence providing automated decision making for appropriately aligning risk and context. In some cases, condition control module or engine 305 may dynamically deploy a solution to address any detected misalignment of risk and context. For instance, upon requesting access to a highly classified data source that results in a significant increase in risk score, the condition control engine may select workspace definition modifications that implement security procedures suitable for the higher risk score. In another example, based on hardware resources available on IHS 100, condition control module 305 may determine a risk score for an existing workspace operating on IHS 100 may be lowered through adaptation of the workspace into a primary workspace that operates using the core hardware resources of IHS 100 and one or more subordinate workspaces that operate on discrete external hardware components 214 coupled to IHS 100.

Application services 301 may include a group of web services 306 called on by UI and automation services 302 to support various aspects of the orchestration of workspaces. Particularly, web services 306 may include application and workspace services 307 that may assemble and package applications for deployment in a workspace (e.g., an ".msix" file packaged and deployed to a MICROSOFT HYPER-V container).

In some embodiments, a workspace definition may be used to specify whether a user will be provided access to an application in this manner. Web services 306 may also include tenant subscription module 308 that performs dynamic configuration of an IHS and deployment of the described workspace orchestration services at the Point-of-Sale (POS) of an IHS.

License tracking module 309 may be used to maintain and track license information for software, services, and IHSs.

Access control module 310 may provide top level access controls used in controlling access to data and applications by authorized users.

Unified Endpoint Management (UEM) module 311 may be configured to support the described orchestration of workspaces on various IHSs that may be utilized by a particular user.

Web services 306 that may be used in support of workspaces may further include resource provisioning services 312 for configuring an IHS or workspace with secrets/credentials necessary to access specific resources (e.g., credentials for use of VPNs, networks, data storage repositories, workspace encryption, workspace attestation, and workspace-to-device anchoring).

In some cases, resource provisioning services 312 may include secrets provisioned as part of a trusted assembly process of IHS 100 and, in some instances, associated with a unique identifier 348 of IHS 100 (e.g., service tag, serial number, etc.).

Web services 306 may also include an authorization/token module that provides identity functions and may connect to various authentication sources, such as, for example, Active Directory.

Endpoint registration module 314 may be configured to register IHSs and/or workspaces with management service that tracks the use of the described workspace orchestration.

In some scenarios, directory services module 315 may be configured to provide active directory services (e.g., AZURE ACTIVE DIRECTORY from MICROSOFT CORPORATION).

Device configuration services 316 enable central configuration, monitoring, managing, and optimization of workspaces that in certain contexts may operate remotely from an IHS and may only present user 201 with an image of the workspace output. In cooperation with resource provisioning services 312, device configuration services 316 may also handle secret creation and IHS configuration and, in some cases, may be out-of-band capable and handle selected operations to the endpoint.

As described, IHS 100 may operate a primary workspace and one or more subordinate workspaces that operate on peripheral devices 214. In some instances, IHS 100 may be able to operate with subordinate workspaces on peripheral devices without input from a remote orchestrator beyond providing a workspace definition that authorizes local orchestration of subordinate workspace by a primary workspace of IHS 100.

For example, IHS 100 with a laptop form factor may be coupled to a public workstation, such as at a hotel or airport, that includes peripheral devices 214 such as an external monitor, mouse, keyboard, and/or printer. In some instances, one or more of these peripheral devices may have been previously configured to operate a subordinate workspace, where a subordinate workspace of a selected peripheral device specifies one or more roles that may be fulfilled by that selected peripheral device. In such instances, upon coupling of the laptop to the workstation and these peripheral devices, the primary workspace that is operating on IHS 100 identifies subordinate workspaces already operating on the peripheral devices and initiates local orchestration of these subordinate workspaces.

However, in some instances, IHS 100 may rely on remote orchestration service 206 to assist in configuring peripheral devices 214 for operation of subordinate workspaces. In such instances, IHS 100 may interface with resource provisioning services 312 of component 300A to configure unknown and/or untrusted peripheral devices. Based on information reported by IHS 100, resource provisioning services 312 may identify a detected peripheral device and provide a subordinate workspace definition for configuring the peripheral device for operation by a primary workspace operating on IHS 100. In some embodiments, resource provisioning services 312 may identify specific roles that may be fulfilled by the detected peripheral device, and it may provide a subordinate workspace definition that configures support for one or more roles by the peripheral device. Resource provisioning services 312 may interface with various systems in identifying peripheral devices and determine roles that may be fulfilled by peripheral devices 214.

Still referring to FIG. 3A, manufacturer integration components 317 communicate with application services 301 and client IHS 100 to provide features that are usable during workspace evaluation and instantiation, where these features are based upon information available to the manufacturer of client IHS 100.

For instance, certificate authority 318 may include an entity that issues digital certificates that may be used in validating the authenticity and integrity of the hardware.

Identity service module or engine 319 may be configured to manage the user's or owner's identity as well as brokering identification for use of customer directory 322.

Order entitlement module or engine 320 may be responsible for managing the entitlements purchased as well as the associated issued certificates signed by 318.

Ownership repository 321 may manage user entitlements associated with IHSs and their ownership and may provide support for users transferring ownership of an IHS and conveying the entitlements associated with that IHS. In certain scenarios, ownership repository 321 may use this transfer of ownership to decommission the secrets associated with the entitlements embedded in the IHS.

Customer directory 322 may be configured to authenticate and authorize all users and IHSs in a network, such as assigning and enforcing security policies for all IHSs and installing or updating software (in some cases, customer directory 322 may work in cooperation and/or may be the same as directory services 315).

Referring now to component 300B of FIG. 3B, IHS 100 may be configured to operate local management agent 332 that may run within secure execution environment 345 hosted by a trusted controller 341, such as EC 115 of FIG. 1. In other embodiments, local management agent 332 may operate as a trusted and attestable process of the OS of IHS 100.

In some embodiments, local management agent 332 may include a workspace engine suitable for instantiating and managing the operation of one or more workspaces 331A-N on IHS 100. As described, the capabilities of a workspace may be modified based on changes in the productivity and security contexts in which the workspace is operating.

Accordingly, the workload(s) in each of the workspaces 331A-N may be hosted in a public cloud, a private cloud, a specific server, locally hosted on IHS 100, or in various topologies of subordinate workspaces, depending on the context in which a workspace is operating.

These allocations of workspace computing for each workspace 331A-N may be prescribed by the workspace definition that is used to build and operate each workspace. As described, the workspace definition may be created by workspace orchestration service 206 based upon context information provided by IHS 100, security targets for each workspace 331A-N, and productivity targets for each workspace 331A-N.

In some embodiments, local management agent 332 may be configured to host, launch, and/or execute workspace hub 327 that provides launch point 203 by which user's initiate workspaces through the selection of managed data and resources. In various embodiments, launch point 203 may be an agent, application, special-purpose workspace or web portal the provides an interface by which a user may select from an aggregated collection of data sources, applications, calendars, messages or other managed information or resources that are available to the user of IHS 100 via operation of a workspace as described herein.

In various embodiments, launch point 203 may be provided in the form for textual, graphical and/or audio user interfaces that allow a user of IHS 100 to select available data and/or resources. In some embodiments, workspace hub 327 may utilize local environment management module 328 in providing the workspace interface that is presented to the user on IHS 100 and doing so in a consistent manner across workspaces 331A-N.

Workspace hub 327 may also include a local intelligence logic or engine 329 used to support modeling the use of IHS 100 to improve characterization of the actual risk associated with a risk context. User authentication and access control operations may be performed by local identify module 330 that may interface with trusted controller 341 in providing user authentication.

In some cases, each instantiated workspace 331A-N may be an environment that provides a user with access to requested data or applications, where the environment may be isolated in varying degrees from the hardware and software of IHS 100 based on the security context and productivity context in which each workspace 331A-N is operating. In some instances, the selection of a data source or resource that is available to user via launch point 203 may result in launching a new workspace.

For instance, if a user launches a browser through selection of an icon displayed by launch point 203, a new workspace may be created and launched according to a workspace definition that has been selected for providing the user access to a web browser in the security and productivity contexts in which the request has been made. In a scenario where the user double clicks on a confidential presentation file available from a data source that is provided by launch point 203, an additional workspace may be instantiated with a presentation application providing access to the requested presentation file, where this new workspace is created based on a workspace definition that provided appropriate security for access to the confidential presentation).

In other instances, a selection of the presentation file by a user may result in the presentation being made available through the existing workspace, in some cases using the existing workspace definition and, in other cases, using a workspace definition that has been modified to support the requested access to the confidential presentation file.

Although workspaces 331A-N supported by IHS 100 may each be isolated to varying degrees from the hardware and/or software of IHS 100 and from each other, a user of IHS 100 may expect to be able to operate the multiple workspaces 331A-N in a manner that allows content to be transferred between the different workspaces 331A-N. For instance, a user may select a portion of the data displayed in workspace 331A and utilize operating system or other workspace functions to copy the data for copying to workspace 331B.

In various embodiments, local management agent 332 may operate in full or in part on secure platform 345 hosted by trusted controller 341 that operates independent from the OS of IHS 100. In some embodiments, all or part of local management agent 332 may operate as trusted components of the operating system of IHS 100.

To execute the various operations described herein, local management agent 332 may include command monitor 334 configured to provide instrumentation to receive commands from workspace orchestration service 206 and thus enable access to IHS 100. In some embodiments, all or part of local management agent 332 may operate as trusted components (of the OS) of IHS 100.

To execute the various operations described herein, local management agent 332 may include command monitor 334 configured to provide instrumentation to receive commands from workspace orchestration service 206 in support of the workspaces operating on IHS 100. For instance, such commands supported by local management agent 332 may provide for a new workspace definition to be specified for an individual workspace 331A-N, such as through a new workspace definition that reconfigures use of existing IHS resources into a primary workspace and one or more subordinate workspaces, where the primary workspaces and each of the subordinate workspace all operate according to their own respective workspace definitions.

In some embodiments, command monitor 334 may be reconfigured to interface with different workspace orchestration services in support of the ability to transfer orchestration of an individual workspace 331A-N between different workspace orchestration services. In some embodiments, command monitor 334 may be configured to interface with workspace orchestration service 206 that provides support for utilizing subordinate workspaces on peripheral devices 214 that are coupled to IHS 100, and in particular, for supplementing a subordinate workspace topology with role-based subordinate workspaces for use in operating shared-use peripheral devices.

Local management agent 332 may also include telemetry module 335 configured for communicating collected information to the workspace orchestration service 206, including reporting changes in context that may warrant adjustments to workspaces 331A-N, such as changes detected in peripheral devices 214 coupled to IHS 100 and that may operate subordinate workspaces.

Data aggregator 336 may track all data sources and other resources (e.g., applications, local or cloud-based services) provided to the user via a workspace.

Local management agent 332 may utilize resource manager module 337 that is configured to manage access to data, network configuration, such as for VPNs and network access, identity information, access control, and resource provisioning services.

Security module 338 may be configured to provide various security services.

BIOS interface 339 may provide a secure BIOS interface used for accessing and managing credentials in secure object storage.

BIOS analytics module 340 may be configured to perform forensic services for BIOS telemetry and health assessments.

Persistence module 346 may be configured to support persistence of applications entitled at a POS or assigned by administrators and supported with required license tracking.

Workspace attestation module 333 may provide a platform centric service layer on top of a container engine provided by local management agent 332, and may be used to measure and attest workspaces 331A-N in any suitable manner defined or orchestrated by condition control 305.

As part of secure platform 345, native management module 347 may be configured to enable out-of-band management interface with workspace orchestration service 206, where this OOB interface operates independent form the OS of IHS 100. In some embodiments, the OOB management interface supported by native management module 347 may be utilized by device configuration services 316 of workspace orchestration 206 service to access the secure platform services 345 of IHS 100. In some embodiments, secure platform services 345 may be utilized in communicating with peripheral devices 214 coupled to IHS 100 in supporting the operation of subordinate workspaces on these peripheral devices.

Digital device ID module 348 may provide a unique, unspoofable, cryptographically bound identifier. In embodiments supporting secure platform 345, secure embedded controller 341 may be a hardened hardware module that may include root of trust module 342 configured as a trusted data store and, in some cases for cryptographic processing, that may be trusted within a cryptographic system.

Device attestation service 343 may be configured to perform device assurance and trust services (e.g., secure BIOS and secure boot, etc.). Secure object store 344 may be provided that is configured to lock and access keys, hashes, and/or other secrets in an EC and/or Trusted Platform Module (TPM).

In deployments where IHS 100 may be provisioned by a manufacturer that also controls manufacturer integration components 317, workspace attestation module 333 may operate in conjunction with secure object store 342, authenticated BIOS module 339, and/or digital device identity module 348, etc., to further secure and/or control productivity features available in any of workspaces 331A-N based upon hardware devices and settings unique to that IHS and/or designed specifically by that manufacturer.

To further illustrate how systems and methods described herein operate to modernize workspace and hardware lifecycle management in an enterprise productivity ecosystem, non-limiting use-cases or examples are discussed in turn below.

A First Use Case

In a first use case, a given user may request access to a protected data source on the enterprise's premises using a corporate-owned and imaged notebook configured as IHS 100.

In response to the request, local management agent 332 operating on the user's notebook retrieves information describing the current context and calculates security and productivity targets based on the determined context. In this use case, local management agent 332 may have been installed by IT, and it may be running in the background as a service.

The confidential data may be associated with local management agent 332 on HIS 100, based on file classification (e.g., file metadata/type/properties/permissions, folder location, encrypted region, etc.). Moreover, local management agent 332 may continuously collect current context information and send it to workspace orchestration service 206 for use in scoring the risk and productivity of the workspace (this may also be done at the time of the user's access request or indication of intent).

When the user selects the confidential data, such as via a selection via the OS of HIS 100, local management agent 332 notifies workspace orchestration service 206 of the request and for a workspace definition for a workspace by which the user may be provided access to the confidential data.

In this example, workspace orchestration service 206 may score an overall security risk to have a value of "2," using a weighed, machine learning, or artificial intelligence algorithm, based upon the following context information or inputs, each of which is also given as a risk metric based upon a selected policy: locale: 1 (safe locale); user persona: 1 (known high-confidence in a reasonably sophisticated user classification—a user whom historically does not click on phishing emails); network risk: 1 (low risk because of on premise, wired connection detected); device risk: 1 (high level of control because of corporate owned/managed platform, known versions, security features enabled, etc.); regulatory: 1 (based on user, data, location combinations—e.g., No restrictions with respect to General Data Protection Regulation or "GDPR," Health Insurance Portability and Accountability Act "HIPAA," Payment Card Industry "PCI," technology export, etc.); and data type: 8 (a confidential datafile is being requested).

Workspace orchestration service 206 may also calculate a productivity score to have a value of "9," using a weighed, machine learning, or artificial intelligence algorithm, based upon the following context information or inputs, each of which is also given as a resource metric based upon a selected policy: locale: 10 (office); user persona: 9 (a "skilled" classification based upon advanced compute tasks, proficiency, and/or speed); network speed/latency: 10 (fast, wired, Gigabit Ethernet, or direct to internal network); device performance: 8 (fast, expensive CPU, memory, graphics, but storage only needs—e.g., <10 GB); and data type: 10 (the local, confidential file is easy to read/write with low latency and high performance on local storage).

Second, based upon the security score and/or context information, workspace orchestration service 206 builds a workspace definition having any suitable structure with workspace definition attributes in a machine-readable format (e.g., JSON name-value, XML structured, etc.). In this example, the security target may be deemed to have a value of "1" based upon a combination of attributes values representing loads, needs, or demands on security controls and containment features that may include: threat monitoring: 1 (low demand); threat detection: 1 (low demand); threat analytics: 1 (low demand); threat response: 1 (low demand); storage confidentiality: 2 (low); storage integrity: 2 (low); network confidentiality: 1 (low); network integrity: 1 (low); memory confidentiality: 1 (low); memory integrity: 1 (low); display confidentiality: 1 (low); display integrity: 1 (low); user authentication: 1 (low, basic password is fine, non-multifactor authentication or "MFA," no session expiration); IT administrator scope: 1 (administrator manages remotely but does not need heavy remediation software; and regulatory compliance: 1 (no GDPR, No HIPAA, no PCI, no tech export restriction, etc.).

Based upon the productivity target and/or context information, a productivity target for the workspace definition may be deemed to have a value of "9" (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 10 (can use applications, install applications that the user needs, give them administrator rights, etc.).

Third, after the workspace definition is complete, workspace orchestration service 206 and local management agent 332 may assemble the workspace and instantiate it for the user. For example, local management agent 332 may receive definition files (e.g., JSON, XML, etc.) from workspace orchestration service 206, and it may parse the file to implement security risk controls such as: threat monitoring: 1 (local management agent does not install threat, detection, and response or "TDR" software); threat detection: 1 (local management agent does not install TDR software); threat analytics: 1 (orchestration does not need to gather detailed telemetry from the system, OS will not be enrolled in logging); threat response: 1 (local management agent does not install security threat response agent); storage confidentiality: 2 (local management agent deploys a local filesystem encryption product that the user can optionally enable on specific files as needed with right-click context menus); storage integrity: 2; network confidentiality: 1 (local management agent confirms basic firewall configuration is correct—e.g., IT GPO-controlled); network integrity: 1; memory confidentiality: 1 (local management agent confirms configuration—e.g., No SGX, TXT, or container/sandbox software deployed); memory integrity: 1; display confidentiality: 1 (local management agent confirms graphics drivers installed, privacy screen and camera optionally managed by user); display integrity: 1; user authentication: 1 (local agent confirms basic GPO password rules are configured, and met by user—e.g., number of characters, no session expiration, etc.); IT administrator scope: 1 (local agent runs with system privilege, confirms IT admin accounts are listed in local admin user group—e.g., per GPO); and regulatory compliance: 1 (local agent does not install any compliance assistance software).

After confirming the configuration, workspace orchestration service 206 and local management agent 332 may give the user access to the requested local confidential file, and the user may begin working in a newly created workspace.

A Second Use Case

In a second use case, a user may request access to a confidential datafile while at a coffee shop using an open public network and an IT-managed/owned PC configured as IHS 100.

First, local management agent 332 executed by client IHS 100 retrieves the requested context and calculates security and productivity scores based on context. In this use-case, local management agent 332 may have been installed by IT, and it may be running in the background as a service. The confidential data may be kept on a shared IT-managed network resource on-premises (e.g., back in a main corporate office), and local management agent 332 may be responsible for monitoring when this data path is requested by the user (e.g., the user hits a specific URL, IP, etc.). Moreover, local management agent 332 may continuously collect all current context and send it to workspace orchestration service 206 to assist in scoring processes later (this may also be done at the time of the user's access request or indication of intent, rather than a continuous collection).

When the user selects the desired confidential datafile, the HIS 100's OS calls local management agent 332 associated with the path to the confidential datafile and calls back to workspace orchestration service 206 to request a workspace definition.

In this example, workspace orchestration service 206 may score an overall security risk to have a value of "4," using a weighed, machine learning, or artificial intelligence algorithm, based upon the following context information or inputs, each of which is also given as a risk metric based upon a selected policy: locale: 5 (public, safe country); user persona: 5 (new user, classification data does not exist yet); network risk: 5 (medium, public but common location, wireless connection detected); device risk: 1 (high level of control, corporate owned/managed platform, known versions, security features enabled, etc.); and regulatory: 1 (based on user, data, location combinations—e.g., no restrictions with respect to General Data Protection Regulation or "GDPR," Health Insurance Portability and Accountability Act "HIPAA," Payment Card Industry "PCI," technology export, etc.).

Workspace orchestration service 206 may also calculate a productivity score to have a value of "5," using a weighed, machine learning, or artificial intelligence algorithm, based upon context information or inputs, each of which is also given as a resource metric based upon a selected policy. For instance, security contexts inputs may include: locale: 6 (remote location but in USA major city, in a public area, non-employees are within visual/audio range of device); user persona: 5 (unknown confidence "null" classification, uses default onboarding assumptions); network speed/latency: 4 (medium, wireless but AC on shared network); and device performance: 8 (fast, expensive CPU, memory, graphics, but storage only needs ~<10 GB).

Second, based upon the security score and/or context information, workspace orchestration service 206 builds a workspace definition having any suitable structure with workspace definition attributes in a machine-readable format (e.g., JSON name-value, XML structured, etc.). In this example, a security target may be deemed to have a value of "4" based upon a combination of attributes values representing loads, needs, or demands on security controls and containment features as follows: threat monitoring: 4 (medium demand); threat detection: 4 (medium demand); threat analytics: 4 (medium demand); threat response: 4 (medium demand); storage confidentiality: 4 (medium); storage integrity: 9 (high); network confidentiality: 5 (medium); network integrity: 2 (low); memory confidentiality: 4 (medium); memory integrity: 8 (high); display confidentiality: 7 (medium/high—worried about "shoulder surfers" reading data from an adjacent seat or table nearby, public location) display integrity: 2 (low); user authentication: 4 (medium, two-factor authentication using a hardware token, session expiration upon sleep, screen lock, or logout); IT administration scope: 3 (administrator can monitor, manage, and remediate remotely if the user calls them for help with IT issues); and regulatory compliance: 1 (no GDPR, No HIPAA, no PCI, no tech export restriction, etc.).

Based upon the productivity target and/or context information, a productivity target for the workspace definition may be deemed to have a value of "7" (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 7 (can use applications, can install some IT-approved applications that the user needs, but no administrator rights, because the user cannot be trusted to install only valid/safe productivity software, but can install pre-approved IT applications as needed).

Third, after the workspace definition is complete, workspace orchestration service 206 and local management agent 332 may assemble the workspace and instantiate it for the user. For example, local management agent 332 may receive definition files (e.g., JSON, XML, etc.) from workspace orchestration service 206, and it may parse the file to implement security risk controls such as: threat monitoring: 5 (local management agent installs or confirms prior installation/configuration of TDR software); threat detection: 5 (local management agent installs or confirms prior installation/configuration of TDR software); threat analytics: 5 (orchestration confirms telemetry is accessible, OS will be enrolled in logging if not already enrolled); threat response: 2 (local management agent downloads but does not run remote incident response application—preparation in case incident is detected); storage confidentiality: 5 (local management agent deploys a local container technology, such as sandbox, with restricted "save" permissions such that the confidential files will not be allowed to save locally on the PC, but can be accessed as long as the session is active in memory); storage integrity: 5; network confidentiality: 5 (local management agent steps up firewall protections, disabling all unnecessary ports, and establishes a VPN back to the corporate office for protecting traffic to the local sandbox); network integrity: 5; memory confidentiality: 5 (local management agent configures sandbox container to isolate application and data from other applications/threats that may infiltrate the host OS); memory integrity: 5; display confidentiality: 7 (local management agent confirms graphics drivers installed, enforces privacy screen and uses camera to detect specific onlooker threats); display integrity: 7; user authentication: 4 (local agent confirms basic GPO password rules are configured, and met by user—e.g., number of characters, no session expiration, etc., but also adds in a requirement for hardware token to log in and again to establish network); IT administrator scope: 4 (local agent runs with administrator and remote access privilege, confirms IT admin accounts are listed in local admin user group—e.g., per GPO); and regulatory compliance: 4 (local agent installs state specific rule enforcement or monitoring software).

After confirming the configuration, workspace orchestration service 206 and local management agent 332 may give the user access to the requested local confidential file, and the user may begin working in a newly created workspace.

A Third Use Case

In a third use-case, a user may request access to a confidential datafile in a web hosted remote portal using a browser from Kazakhstan, while at an internet café with a borrowed/rented PC configured as IHS 100, on an open WiFi network.

First, workspace orchestration service 332 intercepts the access request and evaluates the browser and user context and calculates security and productivity scores. In this use-case, there is no local management agent; all that is known is the browser and any telemetry returned or garnered through the HTTP/S session. Assume, for sake of this example, that the confidential data may kept on a shared IT-managed network resource on-premises (e.g., back in a main corporate office) and that the datafile will remain there with only remote rendering/access privileges. Web-based context may be gathered through the browser session or supplied by the user. Moreover, user context may also be collected for the workspace orchestration service through alternate side-channels (e.g., travel calendar information, recent user billing activity on corporate credit card, phone call logs, and/or location data).

When the user selects the desired confidential datafile from the web browser, the back-end web server infrastructure calls back to workspace orchestration service 206 to request a workspace definition.

In this example, workspace orchestration service 206 may score an overall security risk to have a value of "9," using a weighed, machine learning, or artificial intelligence algorithm, based upon the following context information or inputs, each of which is also scored as a risk metric based upon a selected policy: locale: 9 (Kazakhstan); user persona: 1 (user was expected to be there, the timing seems right based upon past logins, and he has a biometric watch communicator proving he is alive, himself, and located where he says he is—so that IT can always trust him); network risk: 9 (high, public and in a very obscure place); device risk: 9 (zero trust); and regulatory: 8 (based on user, data, location combinations).

Workspace orchestration service 206 may also calculate a productivity score to have a value of "5," using a weighed, machine learning, or artificial intelligence algorithm, based upon the following context information or inputs, each of which is also given as a resource metric based upon a selected policy: locale: 3 (internet café device without great performance); user persona: 9 (known high-confidence and "skilled" classification—advanced compute tasks, proficiency, and speed); network speed/latency: 3 (low quality—Wireless G from a long way away); and device performance: 3 (have to be able to tolerably browse web pages but based on what the service believes the capabilities will be, the service should build simple ones).

Second, based upon the security score and/or context information, workspace orchestration service 206 builds a workspace definition file having any suitable structure with workspace definition attributes in a machine-readable format (e.g., JSON name-value, XML structured, etc.). In this example, a security target may be deemed to have a value of "9" based upon a combination of attributes values representing loads, needs, or demands on security controls and containment features as follows: threat monitoring: 10 (high demand, to be handled on the server side); threat detection: 10 (high demand, to be handled on the server side); threat analytics: 10 (high demand, to be handled on the server side); threat response: 10 (high demand, to be handled on the server side); storage confidentiality: 10 (high demand, to be handled on the server side); storage integrity: 8; network confidentiality: 10 (high demand, to be handled on the server side); network integrity: 9; memory confidentiality: 10 (high demand, to be handled on the server side); memory integrity: 9; display confidentiality: 10 (high, "shoulder surfers" may read datafile from an adjacent seat or table nearby in a public location); display integrity: 9; user authentication: 10 (high, three-factor authentication using login, hardware token, and biometric satellite watch—session expiration and refreshes every 30 seconds); IT administrator scope: 8 (administrator may monitor, manage, and remediate remotely if the user calls them for help or anything unexpected happens); and regulatory compliance: 10 (all network traffic is securely monitored as will the data presented).

Based upon the productivity target and/or context information, a productivity target for the workspace definition may be deemed to have a value of "3" (defining a usable secure user experience primarily built for consumption and not productivity) based upon a combination of attribute values representing productivity requirements as follows: local storage: 1 (cache only); CPU access: 3 (build for limited expectations); local graphics: 3 (build for limited expectations); and application stack: 1 (web browser experience on a kiosk mode device, limited data entry capability, limited read access to need-to-know only information through VDI rendered kiosk).

Third, after the workspace definition is complete, workspace orchestration service 206 and the remote cloud web portal (e.g., session the user logged into through the browser) may assemble the workspace and instantiate it for the user in the browser. For example, the web portal may receive definition files (e.g., JSON, XML, etc.) from orchestration service 206, and it may parse the file to implement security risk controls such as: threat monitoring: 9 (data center based management agent installs or confirms prior installation/configuration of TDR software); threat detection: 9 (data center based management agent installs or confirms prior installation/configuration of TDR software); threat analytics: 9 (orchestration confirms telemetry is accessible, server hosting web server may be enrolled in logging if not already enrolled—user behavioral telemetry from side channels may also be continuously monitored for suspicious/anomalous activity); threat response: 10 (data center-based management agent sets up watchdog timer to kill session automatically without periodic check-ins from orchestration, user telemetry, and web browser); storage confidentiality: 9 (data center-based management agent builds a progressive web application that may be used to display the data through a secure TLS link—the data will be rendered but only the as-needed portions of visualization presented to the user, and nothing can be saved); storage integrity: 10; network confidentiality: 9 (route traffic through best effort to secure locations—do not allow anything except bitmap renderings through the enforceable network); network integrity: 4; memory confidentiality: 9 (web page viewer only-no data leaves the data center, no confidential input is taken from the rented PC, no keyboard input is allowed, and all input may be captured from randomized virtual keyboard using mouse click coordinates); memory integrity: 8; display confidentiality: 8 (best effort to ensure confidentiality—prompt user at least—adjustable font sizes, but defaults to small fonts, obfuscated text, etc.); display integrity: 2; user authentication: 9 (local agent confirms basic password rules are configured, and met by user—e.g., number of characters, no session expiration, etc., but also adds in a requirement for hardware token and biometric, satellite watch to log in and again to establish network, requiring frequent reconfirmation from user); IT administrator scope: 7 (data center-based remote environment); and regulatory compliance: 8 (local agent does not exist but data center-based agent monitors/blocks data not appropriate).

After confirming the configuration, workspace orchestration service 206 may give the user access to the requested data, and the user may begin working in a newly created workspace.

FIG. 4 is a diagram illustrating an example of method 400 for deploying a primary workspace and detecting/reporting peripheral devices, FIG. 5 is a diagram illustrating an example of method 500 for generating subordinate workspaces, and FIG. 6 is a diagram illustrating an example of method 600 for operating subordinate workspaces.

Particularly, FIG. 4 is a flowchart diagram depicting certain steps of a method, according to various embodiments, for managing subordinate workspaces that operate on peripheral devices coupled to an IHS.

Method 400 begins at 401. At 402, user 201 may request access to a protected resource, where access to the protected resource will be provided to the user via a workspace that is hosted, at least in part, using the hardware and software resources IHS 100. As described above, embodiments may support a launch point by which a user may initiate workspaces for accessing certain protected resources. Upon a user of an IHS initiating such request, a remote workspace orchestration service may be notified of the request and may respond by determining context information for the request. As described, in some instances, a user may operate an IHS using shared, public or otherwise untrusted peripheral devices 214, such as in shared-use workstations available in corporate environments and in public facilities (e.g., hotels, airports, co-working spaces). Accordingly, in such instances, a user may request access to a protected resource upon initiating use of IHS 100 at this location.

Accordingly, at 403, the security context for the requested workspace deployment may be determined. As described above, a local management agent of the IHS may collect various types of information describing a security context for a workspace deployment on an IHS. For instance, the local management agent may collect information describing the user, the authentication status of the user, the security profile for the user, the geographic location of the IHS, whether other individuals are detected in proximity to the IHS, the network in use by the IHS, whether the user is located in a public location, the OS of the IHS, authentication capabilities supported by the IHS, antivirus software in use by the IHS, whether the software in use by the IHS has been validated as authentic, peripheral devices coupled to the IHS and whether any of these are shared-use peripheral devices, peripheral devices that are detected in the vicinity of the IHS, etc. In some instances, the local management agent may also report an inventory of external peripheral devices 214 that are coupled to the IHS, as described in additional detail below. As described above, these various types of collected security context information may then be used to calculate a security score for the workspace deployment.

In a similar manner, at 404, the productivity context for the workspace deployment may also be determined based on collected information. As described above, the productivity context may include various productivity characteristics for a workspace deployment on an IHS, such as performance specifications of the IHS, user characteristics that are indicative of productivity, capabilities of the networks in use by the IHS, peripheral devices of the IHS that are available for use, productivity tools (e.g., speech recognition software) supported by the IHS, etc. As with the collected security context information, the productivity context may be used to generate a productivity score for the workspace deployment.

At 405, based on the security score and the productivity score for the workspace deployment, a workspace definition may be generated by the workspace orchestration service, where the workspace definition specifies the computing architecture for use in the operation of the workspace. For example, where a request is associated with elevated security score due to the request seeking access to highly protected data using an IHS that has recognized security vulnerabilities, the generated workspace definition may specify a computing architecture in which the workspace itself operates on a cloud resource, with only an image of the workspace output being displayed in a graphical user interface of the IHS. In another example where the request is associated with a lower security score due to fewer identified security vulnerabilities of the IHS, the workspace definition may specify a computing architecture in which the workspace operates as a virtual machine that is independent from the operating system of the IHS. In another example where the request is associated with a still lower security score due to the request seeking access to nonprotected data, the workspace definition may specify a computing architecture in which the workspace operates as a container supported by a web browser of the IHS.

In instances where the workspace being deployed is the first workspace to be initiated on the IHS, this workspace may be designated as a primary workspace, where the primary workspace may be used to support one or more subordinate workspace that operate on peripheral devices that are coupled to the IHS.

At 406, the primary workspace is deployed on the IHS based on the workspace definition, where the computing architecture specified in the workspace definition may result in one of various different types of supported workspaces being deployed using computing architectures that utilize core hardware and software resources of the IHS to varying degrees. With the primary workspace deployed in this manner, the user may operate the primary workspace using the computing architecture specified in the workspace definition.

As described, malicious actors may seek to compromise a workspace to gain access to the protected data that is being provided via the workspace. Depending on the computing architecture selected for use by a workspace, different attack surfaces are presented, such that different computing architectures may present different types of vulnerabilities that could be exploited by malicious actors. Some computing architectures may provide greater levels of security than other architectures.

In embodiments, the computing architecture utilized by a primary workspace may be adjusted to utilize one or more subordinate workspaces that operate on peripheral devices that are coupled to the IHS. Through use of subordinate workspaces, embodiments may adjust the risk and productivity contexts of the primary workspace in a manner that improves the ability to securely provide the user with productive access to protected data via the primary workspace.

The risk and productivity of the primary workspace may be improved through the use of subordinate workspaces that define roles in which the primary workspace may operate peripheral devices, thus delineating that capabilities of the peripheral device that may be leveraged by the primary workspace and also defining the attack surface presented by interoperating with the peripheral device. Roles used in specifying the capabilities of a subordinate workspace may be utilized throughout a supported workspace ecosystem, thus supporting the ability for workspaces roles to be used in configuring and operating peripheral devices throughout the workspace ecosystem. As described, such capabilities may be especially advantageous in environments where IHS 100 is being coupled to untrusted peripheral devices, such as in shared-use workstations.

Accordingly, at 407, an inventory of peripheral devices that are coupled to the IHS is collected, such as external peripheral devices 214. In some embodiments, this inventory may be collected by local management agent 332 operating on IHS 100.

Aspects of this inventory of peripheral devices may be additionally or alternatively collected through capabilities of the primary workspace, or by the remote orchestration service 206. As described above, a variety of peripheral devices 214 may be coupled to IHS 100, where these peripheral devices each include varying discrete logic and memory capabilities. Using discrete computing capabilities of peripheral devices 214, embodiments may configure the logic and memory resources of peripheral devices for use in operating subordinate workspaces in support of the primary workspace.

A workspace may operate using a variety of computing architectures, and thus using various computing resources of an IHS. In this same manner, a subordinate workspace may be configured to operate using the computing resources of a peripheral device that is coupled to the IHS. For instance, in a scenario where a peripheral device such as a display projector or a display monitor has been coupled to the IHS, embodiments may utilize the processing and memory capabilities of these display devices to operate a subordinate workspace that is distinct from the primary workspace operating on the core hardware resources of the IHS.

Accordingly, the collected inventory of peripheral devices may include an inventory of detected computing resources of each of the external peripheral devices that are coupled to the IHS. Some peripheral devices may include minimal discrete computing capabilities, which include low-power microcontrollers and limited memory resources. Other peripheral devices may have more substantial computing capabilities, such as docking stations, display monitors, and projection displays that include complex PCBs with high-power controllers or other logic units, and that may include substantial memory resources. Some peripheral devices may include significant processing and memory resources, such as a virtual reality headset or smartphone that include a standalone processor with large amounts of system memory, and that may include various sensors that provide user context information. The collected inventory of a peripheral devices may specify these types of computational and memory resources for each the peripheral devices of the IHS. In some embodiments, the collected inventory information may also specify firmware or other settings in use by each of the peripheral devices.

In addition to determining hardware resources of detected peripheral devices, at 408, embodiments determine whether a subordinate workspace is already operating on a detected peripheral device. As described, an IHS may be operated at a shared-use workstation, which may include peripheral devices that may be coupled to the IHS via wired or wireless connections. In some instances, the peripheral devices may be configured to operate a subordinate workspace that is initiated each time the peripheral device is powered. With this subordinate workspace operating on the discrete logic and memory of the peripheral device, this subordinate workspace is discovered by the primary workspace upon the IHS detecting the peripheral device. Accordingly, in some cases, an IHS may determine that a peripheral device is already operating a subordinate workspace. In those cases, a subordinate workspace automatically loaded by a peripheral device may support default functionality by the peripheral device.

In some instances, certain peripheral devices coupled to an IHS may not support the operation of subordinate workspaces, whereas other peripheral devices may be specifically configured via firmware or other instructions for supporting the configuration and operation of subordinate workspaces and may specify local processing and memory resources of the peripheral devices that are available for use by a subordinate workspace. Accordingly, in some embodiments, peripheral devices may respond to queries from the local management agent and/or from the primary workspace, thus indicating the peripheral device is configured to support a subordinate workspace. The collected inventory may hence specify whether each of the peripheral devices is already configured to support subordinate workspaces, and the resources that are available for use in the operation of subordinate workspaces.

In some embodiments, if the available peripheral devices are not capable of operating subordinate workspaces (or are not presently running subordinate workspaces), method 400 ends at 410. Conversely, in scenarios where a peripheral device is determined to be operating (or capable to operate) a subordinate workspace, the primary workspace may interface with this subordinate workspace to determine roles that are supported by the peripheral device at 409.

In some embodiments, the primary workspace may utilize handshake procedures for validating the authenticity and integrity of a subordinate workspace that is operating on the peripheral device. As part of this handshake, a subordinate workspace may advertise one or more roles that are supported by the peripheral device via operations of the subordinate workspace. For instance, in a scenario where the detected peripheral device is an external camera, a subordinate workspace operating on the camera may indicate support for a video-capture role in which the subordinate workspace supports video capture APIs that are used throughout the workspace ecosystem described herein. In another scenario, the camera may be in a trusted environment, such as a conference room at a corporate office of the employer that provides support for the IHS and may thus operate a subordinate workspace that supports video-capture roles and also supports a video-storage role in which the camera stores the captured video to a corporate cloud storage. All such roles that are supported by a peripheral device may be determined as part of the handshake between a primary workspace and a subordinate workspace.

Once the roles for available subordinate workspaces have been identified, the primary workspace begins local orchestration of these subordinate workspaces. As part of this orchestration, the primary workspace may adjust the roles of a subordinate workspace that are utilized. For instance, in the above example of a camera that supports a video-capture role and a video-storage role, initial configuration of the camera's subordinate workspace for operation by the primary workspace may have been limited to video capture, such that the subordinate workspace was configured to support only video capture APIs, thus limiting the attack surface of this subordinate workspace. After some time, the user may initiate a request for recording of the video captured using the camera. In response, the primary workspace may interface with the subordinate workspace of the camera to activate the video storage APIs that are supported by the subordinate workspace. In this manner, orchestration of the subordinate workspace by the primary workspace may include management of the roles that subordinate workspaces are currently providing for use by the primary workspace.

Orchestration of subordinate workspaces by a primary workspace may also include orchestration activities such as those described with regard to workspace orchestration service 206 in the orchestration of primary workspaces operating on the core resources of IHS 100. For example, the primary workspace may serve to upgrade software utilized by the subordinate workspace, such as upgrading driver programs utilized to operate a peripheral device. In addition, the primary workspace may support collection of telemetry generated by the subordinate workspace. In some instances, the telemetry from the subordinate workspace may be forwarded to workspace orchestration service 206 or the telemetry may be utilized directly by the primary workspace, such as in evaluating the security and productivity contexts of the peripheral device, where changes in context may trigger an evaluation of the suitability of the subordinate workspace definition currently in use by the peripheral device.

In some embodiments, orchestration provided by the primary workspace may also provide authentication of the user to access protected features of a peripheral device. For instance, in a scenario where the peripheral device coupled to the IHS is a HMD and the protected data includes virtual reality information that will be displayed via the HMD, embodiments may operate a subordinate workspace on the HMD hardware, where this subordinate workspace requires authentication of the IHS user in order to activate the display of the HMD and thus to provide a display of the protected data. In support of these capabilities, the primary workspace may support authentication APIs by which the HMD can confirm the identity of user 201.

In some embodiments, orchestration provided by the primary workspace may also provide management of specific groupings of subordinate workspaces in a manner that supports collective use of a group of shared peripheral devices. As described, a subordinate workspace operating on a peripheral device may specify roles that are supported by that peripheral device. In some embodiments, roles implemented by peripheral devices may be arranged into a group that is collectively utilized and managed by a primary workspace.

For example, a primary workspace may support a "conference room" grouping of subordinate workspace roles. In orchestration of such a grouping, the primary workspace may identify a peripheral device that supports a "display projector" role, a peripheral device that supports a "audio speaker" role, a peripheral device that supports a "micro-phone" role, and a peripheral device that supports a "video capture" role.

As part of this orchestration, the primary workspace may properly authenticate the user of the IHS as required by each of the subordinate workspaces operating on each of these peripheral devices, thus authorizing the user's ability to use peripheral devices supporting each of these roles of a "conference room" grouping.

Upon entering a conference room setting with an IHS, the primary workspace may orchestrate connections with all peripheral devices supporting roles for this grouping, thus allowing the user to begin speaking through a microphone peripheral device, to display content via a projection display peripheral device, connect to an HMD, use a provide mouse or other pointing device, etc. Through such orchestration, the primary workspace ensures that redundant operations and contention for peripheral device resource is avoided. For instance, the primary workspace may not have use of a microphone until the subordinate workspace operating on the IHS receives control of the microphone from the remote orchestrator, thus ensuring the microphone is controlled by one user at a time and allowing seamless transfer of opera-tion of the peripheral device between users.

In another grouping of peripheral device roles that may be orchestrated by a primary workspace, peripheral devices may support a point-of-sale (POS) system. In a POS group-ing of roles, the primary workspace may identify any available peripheral devices that support roles of a "bar code scanner," "card reader," "touchscreen," "RFID scanner," "printer," "scale," etc. The subordinate workspaces of peripheral devices that support each of these roles may do so according to APIs supported throughout the workspace ecosystem described herein.

Based on the roles supported by detected peripheral devices, the primary workspace may support a POS system with varying capabilities. For instance, if no "bar code scanner" role is identified within the subordinate work-spaces, POS operations supported by the primary workspace are limited to other forms of product identification, such as using QR code scanning supported by images captured by an internal or external camera, where an external camera may be managed according to a "QR scanner" role. As different peripheral devices become available, orchestration by the primary workspace may be used to adjust the POS capa-bilities that can be supported by the IHS.

As indicated below, through orchestration operations sup-ported by the primary workspace, the subordinate work-spaces interface with the primary workspace according to the supported roles that have been selected for use by the primary workspace. During this orchestration, peripheral devices may be added and removed. When a peripheral device is coupled to the IHS, or as indicated at 408, in scenarios where the peripheral device is not already config-ured for operation of a subordinate workspace, embodiments may utilize the workspace orchestration service 206 in configuring a new peripheral device for operation of a subordinate workspaces that is managed by the primary workspace.

As described, embodiments may collect an inventory of the peripheral devices that are coupled to the IHS. This collected inventory may specify the resources of a peripheral device that are available for use in the operation of subor-dinate workspaces. As at 409, this inventory of peripheral devices coupled to the IHS is transmitted to a remote orchestrator.

In some instances, the inventory will be reported to the same remote orchestrator that provided the workspace defi-nition of the primary workspace. However, as described, orchestration of a workspace may be transferred between remote orchestrators throughout the lifespan of the work-space. As such, the collected inventory of peripheral devices may be reported to a remote orchestrator that specializes in supporting the configuration of subordinate workspaces, or a remote orchestrator that specializes in providing use of protected data, such as an orchestrator that controls employee access to the employer's protected data.

Now referring to FIG. 5, method 500 provides for the configuration, by workspace orchestration service 206, of subordinate workspaces on peripheral devices coupled to an IHS. Specifically, method 500 begins at 501. At 502, the remote orchestrator receives the collected inventory of peripheral devices that are coupled to the IHS on which the primary workspace is operating. At 503, the orchestrator may select the peripheral devices that will be utilized to operate subordinate workspaces.

In some embodiments, the peripheral devices for use of subordinate workspaces may be selected based on the pro-tected data that is being accessed and/or generated using the primary workspace. For instance, in a scenario where the protected data being accessed using the primary workspace is a document that includes proprietary technical data, all peripheral devices that will be used in the display and/or manipulation of this data will be selected for operation of subordinate workspaces.

In some embodiments, the peripheral devices may be selected based on the hardware capabilities reported in the inventory for each of the peripheral devices. For instance, in a scenario where the protected data accessed by the primary workspace is streaming data, peripheral devices with mini-mal control logic may be omitted from consideration for subordinate workspaces on the basis that such devices lack sufficient processing resources to compromise streaming data. In some embodiments, all reported peripheral devices that are coupled to the IHS will be selected for operation using subordinate workspaces, even if some of these sub-ordinate workspaces will be used only to effectively restrict or control the operation of a peripheral device, thus provid-ing a capability for limiting these peripheral devices in a manner that improves the security context of the primary workspace.

Additionally, or alternatively, peripheral devices that are coupled to the IHS may be selected for operation using subordinate workspaces based on the roles that are sup-ported by the respective peripheral devices. In some instances, remote orchestration service 206 may determine the roles that may be supported by a peripheral device based on the reported hardware and software of the peripheral device. For example, based on firmware and hardware specifications and management interfaces reported by the peripheral device. In some instances, the supported roles for a peripheral device may be determined based on challenges by the remote orchestration service that verify that the peripheral device is operating using trusted instructions in supporting one or more roles.

Challenges of peripheral devices by the remote orches-tration service also provide assurances when authorizing use of the peripheral device in additional roles. For instance, a camera that operates using recognized firmware and hard-ware may be authorized for operation in a video-capture role but may be further authorized for operation in a video-storage role if challenges by workspace orchestration service

206 confirm that the peripheral device is operating using trusted factory-installed instructions.

Once the roles that are supported by a peripheral device have been determined, the peripheral device may be selected based on whether the roles it supports are specified for use by the primary workspace. For instance, in a scenario where the workspace definition for a primary workspace provides authorization for operation of a point-of-sale application that connects to secured payment networks and that operates using a POS grouping of subordinate workspace roles, the workspace definition also authorizes use of peripheral devices that support POS roles from this grouping, such as described above.

Accordingly, when a primary workspace is configured for POS operations, all detected peripherals that support POS roles may be configured for operation using subordinate workspaces that are orchestrated by the primary workspace. When a primary workspace has not been configured for POS operations using a POS grouping of roles, peripheral devices that exclusively support POS roles, such as a credit card scanner, are not selected for operation using a subordinate workspace.

At 504, once the peripheral devices that will be used to operate subordinate workspaces have been selected, a security context is determined for each of the peripheral devices. In some embodiments, a variety of security context characteristics may be evaluated to determine a security score for the operation of a subordinate workspace by a particular peripheral device. Characteristics of a peripheral device that may be evaluated in determining a security score may include: hardware resources (e.g., types of processors, microcontrollers, memory, I/O ports) of the peripheral device, versions and type of firmware or other instructions used to operate the peripheral device, authentication of the firmware being used to operate the peripheral device, supported user authentication, supported power states, networking capabilities, supported roles, and performance and security characteristics of these networking capabilities.

At 505, as with the primary workspace, workspace orchestrator service 206 may determine a productivity context for the peripheral device. Examples of a productivity context information used to calculate a productivity score for a subordinate workspace may include: the types of data or data sources available to user 201, use of the protected data that is being used by the primary workspace, minimum latency for a subordinate workspace operating on the peripheral device, responsiveness of the peripheral device, productivity applications available for operation in the subordinate workspace, the ability to transfer data to and/or from the peripheral device via the subordinate workspace, supported roles, the ability for the subordinate workspace to interface with other applications operating on the hardware of the peripheral device (i.e., degree of acceptable isolation of the subordinate workspace), etc. As in the orchestration of the primary workspace, the productivity and security scores for a subordinate workspace may also be based on or modified using behavioral analytics related to user 201, IHS 100 telemetry and/or environmental information (e.g., collected via sensors 112).

At 506, for each of the peripheral devices that have been selected for operation of subordinate workspaces, the orchestrator may determine restrictions on use of the protected data by the peripheral device. Such restrictions may be based on the security and productivity contexts for the operation of a subordinate workspace on a peripheral device, such as based on the productivity and security scores that have been determined for operation of the subordinate workspaces. For instance, based on a high security score that has been assigned to an external camera that operates with untrusted firmware, this peripheral device may be restricted in accessing protected data that is available within the primary workspace.

In a scenario where the protected data being accessed via the primary workspace includes a presentation video and attached files that are referenced in the video, an external display monitor may be allowed use of video data from the primary workspace but is restricted from accessing other data related to the video, and in particular the attached files.

Where a peripheral device is a head-mounted display (HMD) used for virtual or augmented realty, access to protected data may be granted, thus allowing the protected data to be viewed in the virtual reality session, but the protected data must be stored in a segregated memory area of a storage device of the HMD, where the segregated memory is for exclusive use of the subordinate workspace. In some embodiments, restrictions on use of protected data may be based on the approved roles for the subordinate workspace. For instance, in a scenario where a peripheral device, such as a camera, has been authorized for a video-capture role, no access to protected data files is permitted.

At 507, workspace orchestrator service 206 may determine, select, or identity approved roles for each of the selected peripheral devices in interfacing with the primary workspace. For instance, an external camera that operates with untrusted firmware may be restricted to interfacing with the primary workspace only to transmit video data captured by the camera to the primary workspace, as provided by a video-capture role specified for the camera. The subordinate workspace may be restricted in this manner through the subordinate workspace definition specifying an API supported by the primary workspace, where this API only supports function calls that allow the camera to transmit captured video data to the primary workspace. Such APIs that will be supported by a subordinate workspace in its communications with the primary workspace may be selected based on the approved roles for the subordinate workspace.

For instance, in a scenario where the peripheral device is a smartphone device that has been connected to an IHS laptop, a subordinate workspace may operate on the smartphone. Based on the numerous capabilities of a smartphone, a variety of roles may be supported. However, in a scenario where a smartphone is being used for hotspot network access capabilities, APIs that support hotspot operations are provided for communications between the primary workspace and the subordinate workspace operating on the smartphone. If the smartphone will be used in a video-capture role, thus allowing transfer of captured vide from the smartphone to the IHS via the primary workspace and subordinate workspace, video capture APIs are also provided for use by the primary workspace in interfacing with the subordinate workspace operating on the smartphone.

In this manner, various capabilities and restrictions on accessing the protected data may be implemented. In the example of an external display monitor used to view a presentation video, the monitor may be restricted from accessing protected data other than video data to be displayed, but the monitor may not be otherwise restricted from interfacing with the primary workspace, such as to report available buffering resources. In the example of an HMD, the subordinate workspace on the HMD may be limited to primary workspace queries that are limited to support of an ongoing virtual reality session. Once that virtual reality session has been terminated, the subordinate workspace may continue operating on the HMD, but the subordinate workspace may be restricted to receiving communications from the primary workspace, such as instructions for connecting the HMD to a new virtual reality session.

At 508, workspace orchestrator service 206 generates a subordinate workspace definition for the creation and operation of a subordinate workspace the operates on the hardware of a specific peripheral device of the IHS, where the ongoing operation of the subordinate workspace may be managed (i.e., orchestrated) by the primary workspace operating on the IHS. As with the primary workspace, a subordinate workspace definition specifies a collection of attributes that describe a workspace that may be assembled, created, and deployed in a manner that satisfies a security target and a productivity target considering the security context and the productivity context in which the subordinate workspace is to be deployed. Whereas a primary workspace may be deployed using the core hardware of the IHS, each subordinate workspace operates using the more-limited hardware resources of a peripheral device.

A subordinate workspace definition may prescribe: hardware resources of the peripheral device to be utilized and firmware versions that must be used to operate these hardware resources, authentication requirements for operation of the peripheral device by user 201, isolation of the subordinate workspace from other software operating on the peripheral device, applications or programs to be installed for operation within the subordinate workspace, data sources that are available within the subordinate workspace and requirements for routing and/or storing that data, additional applications or programs that are installed and used in the subordinate workspace, security protocols to be enforced by the subordinate workspace and that modify the scope of the attack surface of the subordinate workspace, primary workspace APIs that are available for use by the subordinate workspace, approved roles that may be fulfilled by the peripheral device, reference measurements for use in validating the integrity of the subordinate workspace, etc. As above, the security target of a subordinate workspace refers to the attack surface presented by the subordinate workspace that is created and operated based on a subordinate workspace definition, while the term productivity target for a subordinate workspace generally refers to the productivity characteristics of a particular subordinate workspace definition.

At 509, workspace orchestrator service 206 transmits the generated subordinate workspace definition to the IHS. In some instances, the subordinate workspace definition is transmitted to local management agent 332 that initiated and manages the primary workspace. In such instances, the subordinate workspace may then be instantiated by the local management agent in a manner that is isolated from the primary workspace that is already operating on the core hardware resources of the IHS.

In some cases, the subordinate workspace definition is transmitted to the primary workspace that is operating on the IHS. In those cases, the subordinate workspace is instantiated by the primary workspace. The orchestrator may select the local management agent for instantiation of some subordinate workspaces, such as in scenarios where a peripheral device of the IHS is not trusted, or is of limited trust, and thus has a low security score. Conversely, the orchestrator may select a primary workspace for instantiation of other subordinate workspaces, such as in scenarios where a peripheral device has a sufficiently high security score.

Now with reference to FIG. 6, method 600 begins at 601. At 602, the subordinate workspace definition is received by the IHS component that will be instantiating the subordinate workspace. Using received subordinate workspace definitions, at 603, a subordinate workspace is instantiated on the hardware resources of each of the selected peripheral devices of the IHS, where some of the subordinate workspaces may be instantiated by the local management agent and others by the primary workspace.

Regardless of whether the subordinate workspace is instantiated by the local management or the primary workspace, at 604, the primary workspace identifies the roles that are supported by each of the peripheral devices. As above in scenarios where the IHS is coupled to peripheral devices that already support a compatible subordinate workspace, the primary workspace may evaluate the subordinate workspace definition to identify the roles that are supported for peripheral device. As describe above, the primary workspace may select use subordinate workspaces that support existing groups of roles that are being used by the primary workspace, such as selection of a peripheral device that supports a "credit card reader" role by a primary workspace supporting a POS grouping of roles.

At 605, the primary workspace initiates local orchestration of all the subordinate workspaces that are operating on peripheral devices coupled to the IHS. In embodiments, the primary workspace may operate as the local orchestrator for all subordinate workspaces in the same way a remote orchestrator manages primary workspaces.

Accordingly, at 606 the primary workspace interoperates with each of the subordinate workspace, where the communications supported by each subordinate workspace is specified in its subordinate workspace definition. As part of this orchestration, the primary workspace monitors each of the subordinate workspaces for reports of changes in the operating context of a respective peripheral devices.

As in the orchestration of primary workspaces by the remote orchestrator, the primary workspace may evaluate the suitability of the current subordinate workspace definition considering any detected changes to the security or productivity context that characterize the peripheral device. In particular, the primary workspace determines updated security and productivity scores for a peripheral device based on updated security and productivity context information. Once the security score or a productivity score for a subordinate workspace no longer satisfy the corresponding security or productivity target, the primary workspace may initiate the updating of the existing subordinate workspace or termination of the subordinate workspace, and a possible generation of a new subordinate workspace definition for generating a new subordinate workspace that will operate on the hardware of the peripheral device.

Method 600 ends at 607.

An important mechanism for creators of subordinate workspaces, manufacturers of peripheral devices, and other third parties to improve workspace products is to gather and analyze telemetry data. In many cases, however telemetry from subordinate workspaces may include private or sensitive information that subordinate workspace creators and device manufacturers do not want to share with other parties. For example, in some scenarios, a subordinate workspace and its primary/parent workspace may have different, or even competing ownership.

Accordingly, subordinate workspaces that rely on a primary/parent workspace to pass their telemetry back to a telemetry owner need a way to protect sensitive data from being used by upstream workspaces and/or orchestration services without authorization.

For example, a smart display manufacturer may not want to share statistics about the health and life of a display with an IHS, OS, or infrastructure that is being used to transport this information, as it may constitute proprietary information (e.g. trade secrets, etc.) and/or which may be used to build products that compete with the display manufacturer.

To address these, and other concerns, particularly in disaggregated workspace environments where parent workspaces and proxy orchestrators may be present, systems and methods described herein give subordinate workspaces autonomy to create private connections with outside, third-party entities to share confidential telemetry.

In some embodiments, systems and methods described herein may enable subordinate workspaces to request individual encryption keys for protecting telemetry to preserving the confidentiality of that telemetry. For example, pre-provisioning and/or pre-configuring subordinate workspaces and/or peripheral devices with cryptographic identities (e.g., Security Protocol and Data Model "SPDM" device IDs) allows them to be individually addressed by local workspace orchestration agents on primary workspaces.

Individual addresses may be relayed back to subordinate workspace creators or device manufacturers to establish a mutual authentication protocol, which may be used for encryption key agreement and subsequent secure session creation. The secure session may provide a private communication channel for third parties to interact with subordinate workspace telemetry without needing to share the telemetry information with primary workspaces, nor proxy orchestration entities. In some cases, anonymized/sanitized telemetry data may be sent to workspace orchestration service 206 for workforce optimization, etc.

Figures 7, 8:
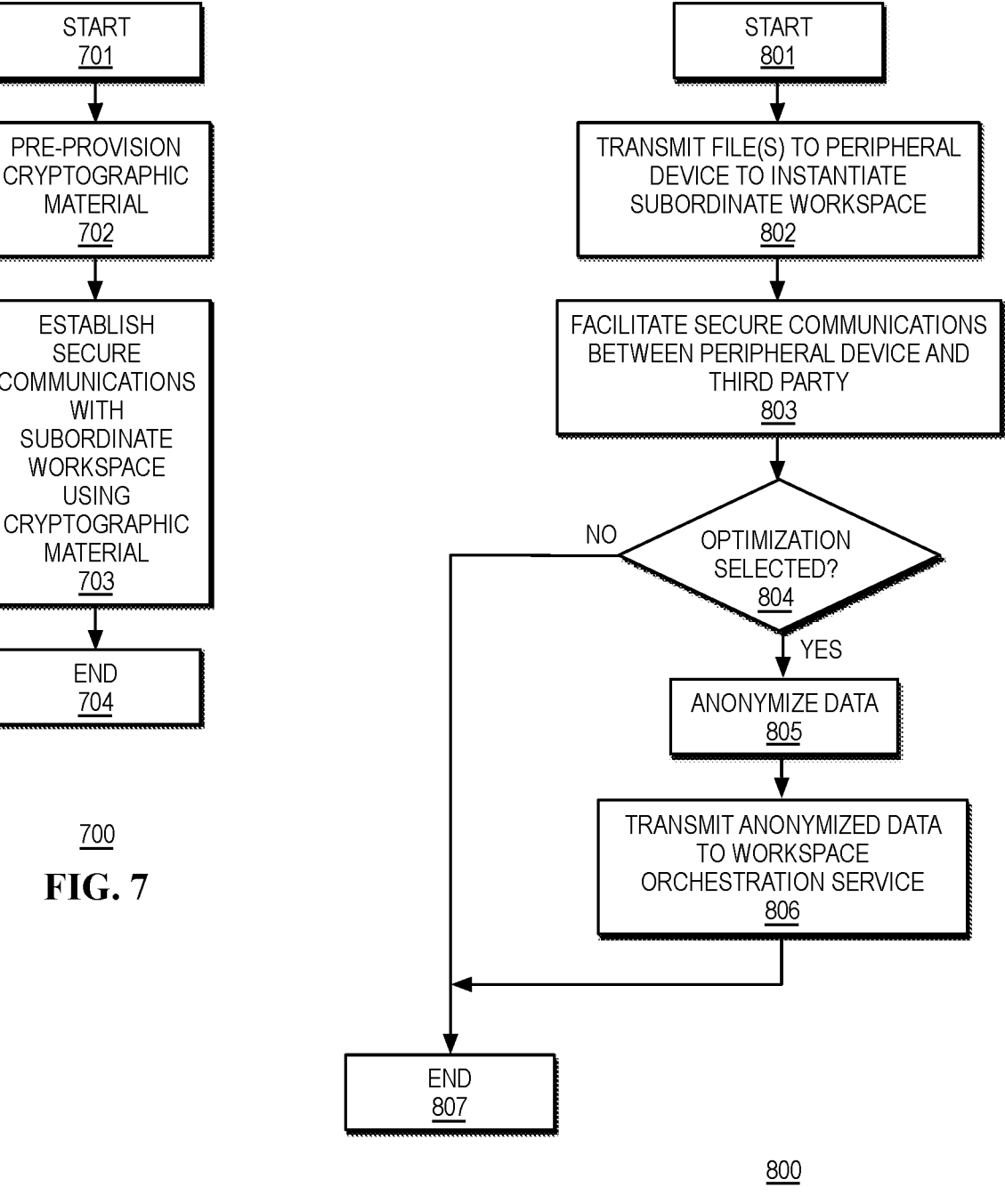
FIGS. 7 and 8 are diagrams illustrating examples of methods for secure communications between subordinate workspaces and third parties, according to various embodiments.

FIGS. 7 and 8 are diagrams illustrating methods 700 and 800 for secure communications between subordinate workspaces and third parties. In some cases, method 700 may be performed, at least in part, by a third party (e.g. a manufacturer of a peripheral device), whereas method 800 may be performed by a primary/parent workspace executed, instantiated, or operated by IHS 100.

Method 700 begins at 701. At 702, a third-party pre-provisions cryptographic material in a peripheral device (and/or the device's chip(s)) such as, for example, encryption keys, digital certificates, SPDM device IDs, etc. Then, at 703, the third party establishes an encrypted or secure communication channel, pipe, or tunnel with a subordinate workspace instantiated, executed, or operated by the peripheral device using the cryptographic material.

It is through this secure communication channel that the peripheral device may transmit telemetry data to the third party. Because the cryptographic material is unknown to the primary/parent workspace and to the orchestration service, the communications are private. Method 700 ends at 704.

Method 800 begins at 801. At 802, a primary/parent workspace of IHS 100 may transmit file(s) to a peripheral device 214 to instantiate a subordinate workspace. These files may be representative of a subordinate workspace definition created based on a selected security and/or productivity score/target.

At 803, the primary/parent workspace may facilitate secure communications between peripheral device and third party, for example, by forwarding challenges requests and responses between the peripheral device and the third party.

At 804, the primary/parent workspace may determine whether an orchestration optimization option is selected. If not, method 800 ends at 807.

If so, the telemetry data produced by the peripheral device may be masked or anonymized at 805, and then provided to workspace orchestration service 206 at 806 to perform optimization determinations. In some cases, telemetry data may be anonymized prior to leaving the peripheral device. In other cases, telemetry data may be anonymized by the primary/parent workspace (e.g., without inspection). Method 800 ends at 807.

Figure 9:
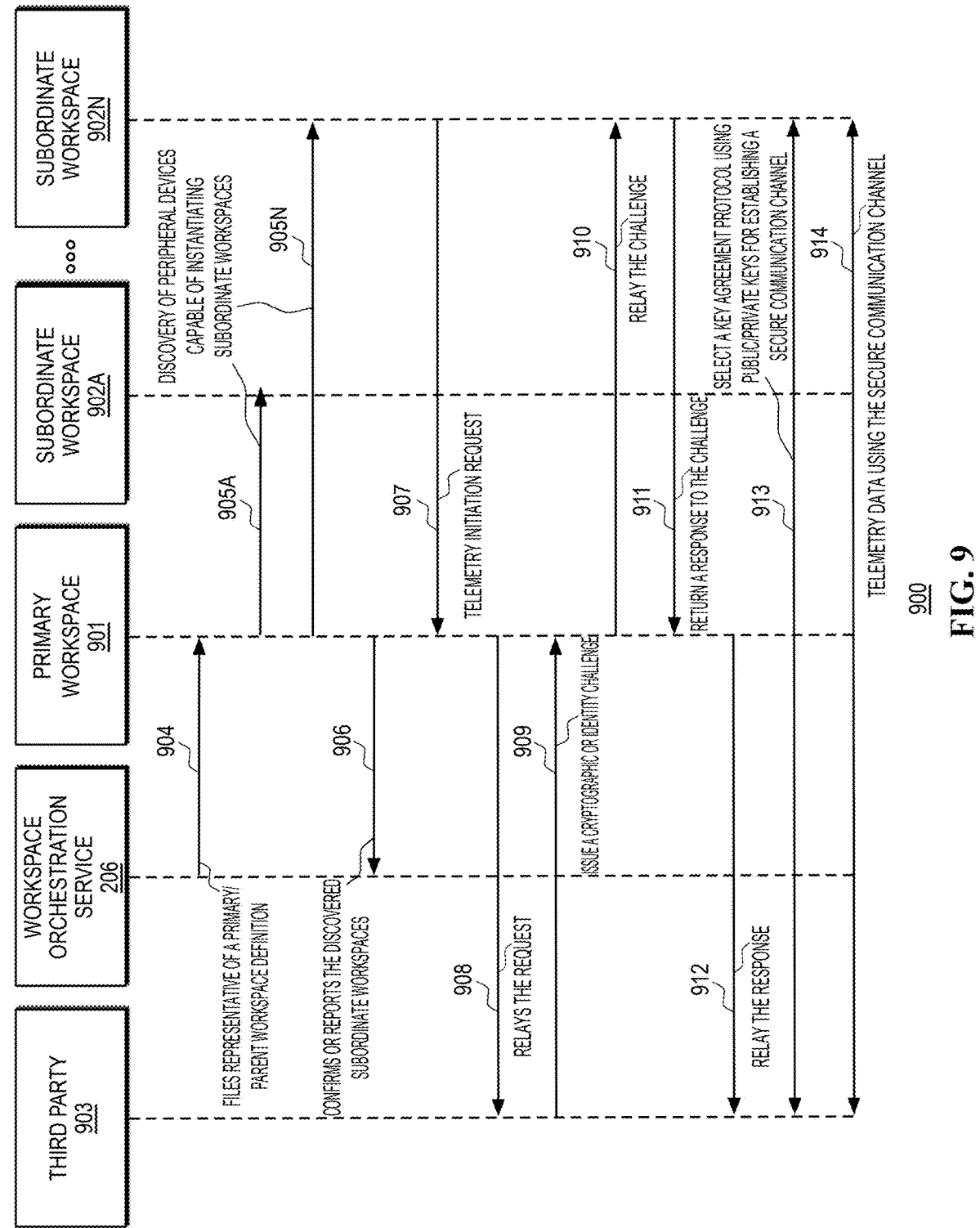
FIG. 9 is a diagram illustrating an example of messages exchanged to establish secure communications between subordinate workspaces and third parties, according to various embodiments.

FIG. 9 is a diagram illustrating an example of messages 900 exchanged to establish secure communications between subordinate workspace 902N and third party 903. At 904, workspace orchestration service 206 sends files representative of a primary/parent workspace definition to client IHS 100 to instantiate primary workspace 901.

At 905A-N, primary workspace 901 discovers peripheral devices 214 capable of instantiating subordinate workspace 902A-N. At 906, primary workspace 901 confirms or reports the discovered subordinate workspaces to workspace orchestration service 206.

At 907, subordinate workspace 902N sends a telemetry initiation request (e.g., including an ID and/or certificate) to primary workspace 901. At 908, primary workspace 901 relays the request to third party 903.

At 909, third party 903 may issue a cryptographic or identity challenge (e.g., by submitting a nonce) to primary workspace 901. At 910, primary workspace 901 may relay the challenge to subordinate workspace 902N.

At 911, subordinate workspace 902N may return a response to the challenge (e.g., a signed nonce) to primary workspace 901. At 912, primary workspace 901 may relay the response to third party 903.

If third party 903 can verify the signed nonce, at 913 it communicates with subordinate workspace 902N to select a key agreement protocol using public/private keys for establishing a secure communication channel. Then, at 914, subordinate workspace 902N sends telemetry data to third party 903 using the secure communication channel.

As such, systems and methods described herein may use lightweight protocols like SPDM to establish subordinate workspace "tunnels" for confidential telemetry transport, which is particularly applicable to modern workforce architectures with disaggregated workspace definitions. These systems and methods may also allow for OEM's to coexist in a complex workspace environment without concern for inadvertently sharing private or trade secret data.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:

a processor; and a memory coupled to the processor, the memory configured with program instructions stored thereon that, upon execution by the processor, cause the IHS to:

transmit one or more files received from a workspace orchestration service to a peripheral device, wherein the one or more files comprise a subordinate workspace definition configured to enable the peripheral device to instantiate a subordinate workspace based on the subordinate workspace definition such that the peripheral device is capable to operate the subordinate workspace, wherein the peripheral device is selected from the group consisting of:

a docking station, a display, a projector, a flash drive, a keyboard, a mouse, a trackpad, a joystick, a camera, a microphone, a speaker, a printer, a scanner, a sound card, or a video card, and wherein the peripheral device comprises a processor/controller and a memory; and facilitate secure communications between the subordinate workspace and a third-party, wherein facilitate the secure communications comprises:

relay, by a primary workspace configured to be executed by the IHS, a telemetry initiation request comprising an identifier and/or certificate from the subordinate workspace to the third-party;

relay, by the primary workspace, a cryptographic or identity challenge comprising a nonce from the third-party to the subordinate workspace;

relay, by the primary workspace, a response to the cryptographic or identity challenge comprising a signed nonce from the subordinate workspace to the third-party; and after the third-party successfully verifying the signed nonce, enable the subordinate workspace and the third-party to select a key agreement protocol based at least in part on public/private keys for establishment of a secure communication channel to transmit telemetry data collected by the peripheral device to the third-party, wherein cryptographic material used to establish the secure communication channel is unknown to the primary workspace and to the workspace orchestration service.

2. The IHS of claim 1, wherein the secure communications utilizes the cryptographic material provisioned by the third-party prior to deployment of the peripheral device.

3. The IHS of claim 2, wherein the cryptographic material comprises at least one of: an encryption key pair, or a digital certificate.

4. The IHS of claim 1, wherein the third party third-party comprises a manufacturer of the peripheral device.

5. The IHS of claim 1, wherein the secure communications comprise the telemetry data collected by the peripheral device.

6. The IHS of claim 5, wherein the telemetry data comprises data indicative of use or health of the peripheral device.

7. The IHS of claim 5, wherein the program instructions, upon execution, further cause the IHS to transmit at least a modified portion of the telemetry data to the workspace orchestration service.

8. The IHS of claim 7, wherein the modified portion of the telemetry data is anonymized or scrubbed of confidential data.

9. A memory storage device configured with program instructions stored thereon that, upon execution by one or more processors of an Information Handling System (IHS), cause the IHS to:

provision cryptographic material to a peripheral device prior to orchestration by a workspace orchestration service, wherein the peripheral device is configured to execute a subordinate workspace relative to a primary workspace based on a subordinate workspace definition such that the peripheral device is capable of operation of the subordinate workspace, wherein the peripheral device is selected from the group consisting of:

a docking station, a display, a projector, a flash drive, a keyboard, a mouse, a trackpad, a joystick, a camera, a microphone, a speaker, a printer, a scanner, a sound card, or a video card, and wherein the peripheral device comprises a processor/controller and a memory; and establish a secure communication channel with the subordinate workspace based at least in part on the cryptographic material, wherein establish the secure communication channel comprises:

receive a telemetry initiation request including an identifier and/or certificate;

issue a cryptographic or identity challenge including a nonce;

receive a response to the cryptographic or identity challenge comprising a signed nonce;

verify the signed nonce by the third party; and in response to successfully verifying the singed nonce, enable the subordinate workspace and the third party to select a key agreement protocol based at least in part on public/private keys to establish the secure communication channel; and receive data from the subordinate workspace, wherein the data comprises telemetry data transmitted via the secure communication channel, wherein the telemetry data is encrypted, based at least in part, the cryptographic material, and wherein the secure communication channel is unknown to the primary workspace and to the workspace orchestration service.

10. The memory storage device of claim 9, wherein the cryptographic material comprises at least one of: an encryption key pair, or a digital certificate.

11. The memory storage device of claim 9, wherein the IHS is operated by a manufacturer of the peripheral device.

12. The memory storage device of claim 9, wherein the data is indicative of use or health of the peripheral device.

13. A method, comprising:

receiving one or more files from a primary workspace at a peripheral device, wherein the one or more files comprise a subordinate workspace definition configured to enable the peripheral device to instantiate a subordinate workspace based on the subordinate workspace definition such that the peripheral device is capable of operating the subordinate workspace, wherein the peripheral device is selected from the group consisting of: a docking station, a display, a projector, a flash drive, a keyboard, a mouse, a trackpad, a joystick, a camera, a microphone, a speaker, a printer, a scanner, a sound card, or a video card, and wherein the peripheral device comprises a processor/controller and a memory; and establishing secure communications between the subordinate workspace and a third-party, wherein establishing the secure communications comprises:

transmitting, by the subordinate workspace, a telemetry initiation request comprising an identifier and/or certificate to the primary workspace for relaying to the third-party;

receiving, by the subordinate workspace from the third-party via the primary workspace, a cryptographic or identity challenge comprising a nonce;

transmitting, by the subordinate workspace to the third-party via the primary workspace, a response to the cryptographic or identity challenge comprising a signed nonce; and after the third-party successfully verifies the signed nonce, selecting by the subordinate workspace and the third-party a key agreement protocol using public/private keys for establishing a secure communication channel used to transmit telemetry data collected by the peripheral device to the third-party, wherein cryptographic material used to establish the secure communication channel is unknown to the primary workspace.

14. The method of claim 13, wherein the secure communications utilize cryptographic material provisioned by the third-party, and wherein the cryptographic material comprises at least one of: an encryption key pair, or a digital certificate.

15. The method of claim 13, wherein the third-party comprises a manufacturer of the peripheral device.

16. The method of claim 13, wherein the third-party comprises a contributor of the subordinate workspace.

17. The method of claim 13, wherein the secure communications comprise data collected by the peripheral device, and wherein the data is indicative of use or health of the peripheral device.

* * * * *